United States Patent
Fischer et al.

(10) Patent No.: US 9,327,674 B2
(45) Date of Patent: May 3, 2016

(54) PASSIVE AIR BAG VENT WITH GUIDE

(71) Applicant: TRW Vehicle Safety Systems Inc., Washington, MI (US)

(72) Inventors: Kurt F. Fischer, Leonard, MI (US); Yohann Le Norcy, Valladolid (ES); Oscar Ugarte, Valladolid (ES)

(73) Assignee: TRW Vehicle Safety Systems, Inc., Washington, MI (US)

( * ) Notice: Subject to any disclaimer, the term of this patent is extended or adjusted under 35 U.S.C. 154(b) by 0 days.

(21) Appl. No.: 14/243,016

(22) Filed: Apr. 2, 2014

(65) Prior Publication Data

US 2015/0283971 A1    Oct. 8, 2015

(51) Int. Cl.
*B60R 21/239* (2006.01)
*B60R 21/2338* (2011.01)

(52) U.S. Cl.
CPC ............ *B60R 21/239* (2013.01); *B60R 21/2338* (2013.01); *B60R 2021/2395* (2013.01); *B60R 2021/23384* (2013.01)

(58) Field of Classification Search
CPC ...................... B60R 21/239; B60R 2021/2395; B60R 2021/23385
See application file for complete search history.

(56) References Cited

U.S. PATENT DOCUMENTS

| | | | |
|---|---|---|---|
| 7,607,690 B2* | 10/2009 | Abe ...................... | B60R 21/231 280/739 |
| 7,651,130 B2* | 1/2010 | Bauberger .......... | B60R 21/2338 280/743.2 |
| 7,878,538 B2* | 2/2011 | Abe .................... | B60R 21/2338 280/736 |
| 7,931,297 B2* | 4/2011 | Abe .................... | B60R 21/2338 280/739 |
| 7,959,184 B2* | 6/2011 | Fukawatase .......... | B60R 21/239 280/739 |
| 8,382,154 B2* | 2/2013 | Suzuki .................. | B60R 21/239 280/739 |
| 8,491,004 B2* | 7/2013 | Mendez .............. | B60R 21/2338 280/739 |
| 2004/0012179 A1* | 1/2004 | Pinsenschaum ...... | B60R 21/233 280/739 |
| 2006/0186655 A1* | 8/2006 | Ehrke ................... | B60R 21/233 280/743.1 |
| 2007/0145729 A1* | 6/2007 | Ishiguro ................ | B60R 21/239 280/739 |
| 2008/0007038 A1* | 1/2008 | Fischer ................. | B60R 21/233 280/743.2 |
| 2009/0020991 A1* | 1/2009 | Abe ...................... | B60R 21/233 280/739 |
| 2011/0031725 A1* | 2/2011 | Rose .................... | B60R 21/2338 280/736 |
| 2012/0104737 A1 | 5/2012 | Fischer et al. | |
| 2012/0235393 A1* | 9/2012 | Fisher ................. | B60R 21/2338 280/742 |
| 2013/0026744 A1 | 1/2013 | Fischer et al. | |
| 2015/0014969 A1* | 1/2015 | Choi .................... | B60R 21/239 280/730.1 |

\* cited by examiner

*Primary Examiner* — Ruth Ilan
(74) *Attorney, Agent, or Firm* — Tarolli, Sundheim, Covell & Tummino LLP

(57) ABSTRACT

An apparatus (10) for helping to protect an occupant (20) of a vehicle (12) comprises an inflatable vehicle occupant protection device (14) inflatable between a vehicle surface (36) and the vehicle occupant. A vent (110) has at least one opening (114) for releasing inflation fluid from the protection device (14). The vent (110) has an actuated condition and a non-actuated condition. A guide tether (113) is connected to the vent door (120). A vent tether (112) is connected to the protection device (14) and includes a guide (123) connected to the guide tether (113) such that the guide (123) and guide tether (113) are slidable relative to one another. Tension on the vent tether (112) applies tension to the guide tether (113) for actuating the vent (110). The vent (110) is configured to be initially in the non-actuated condition upon initial deployment of the protection device (14), with further deployment of the protection device (14) to a predetermined degree causing the vent tether (112) to act on the guide tether (113) to place the vent (110) in the actuated condition.

37 Claims, 19 Drawing Sheets

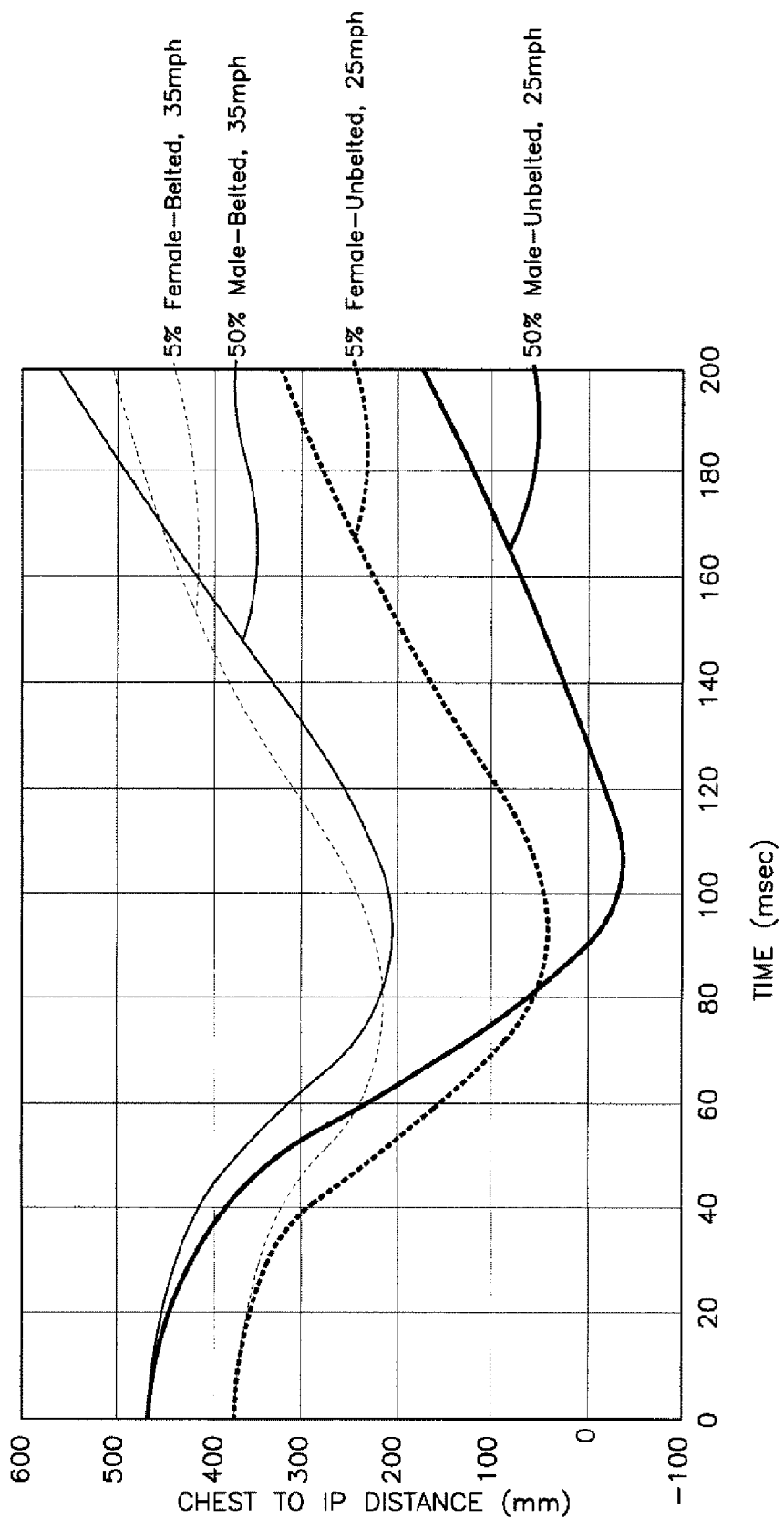

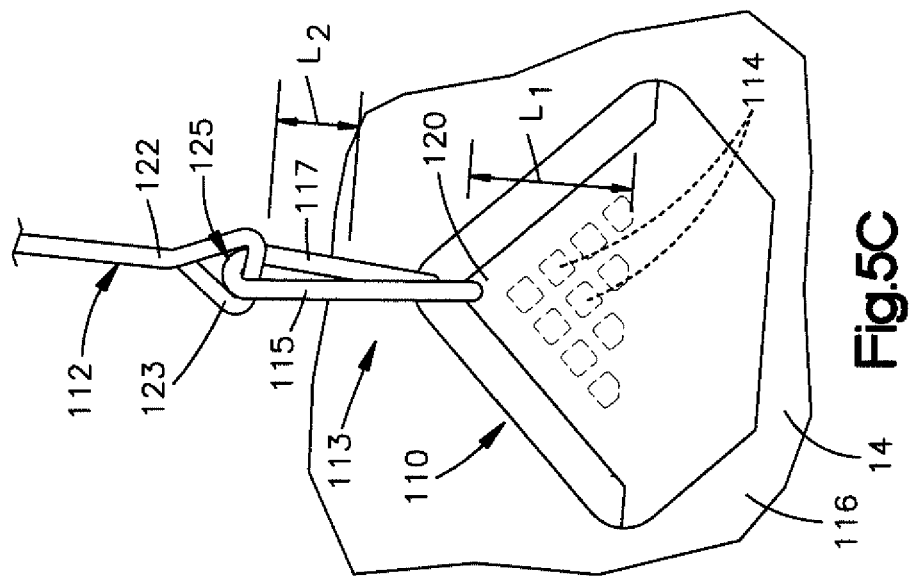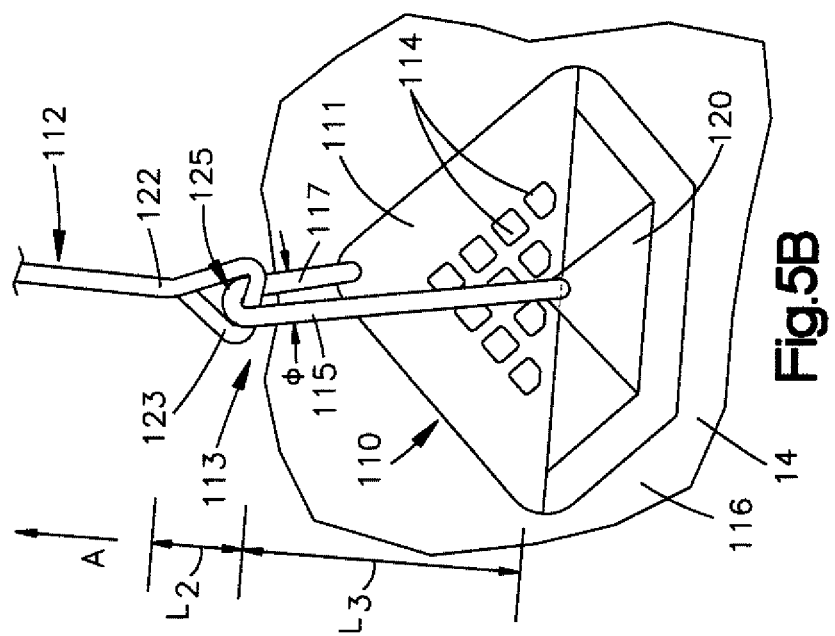

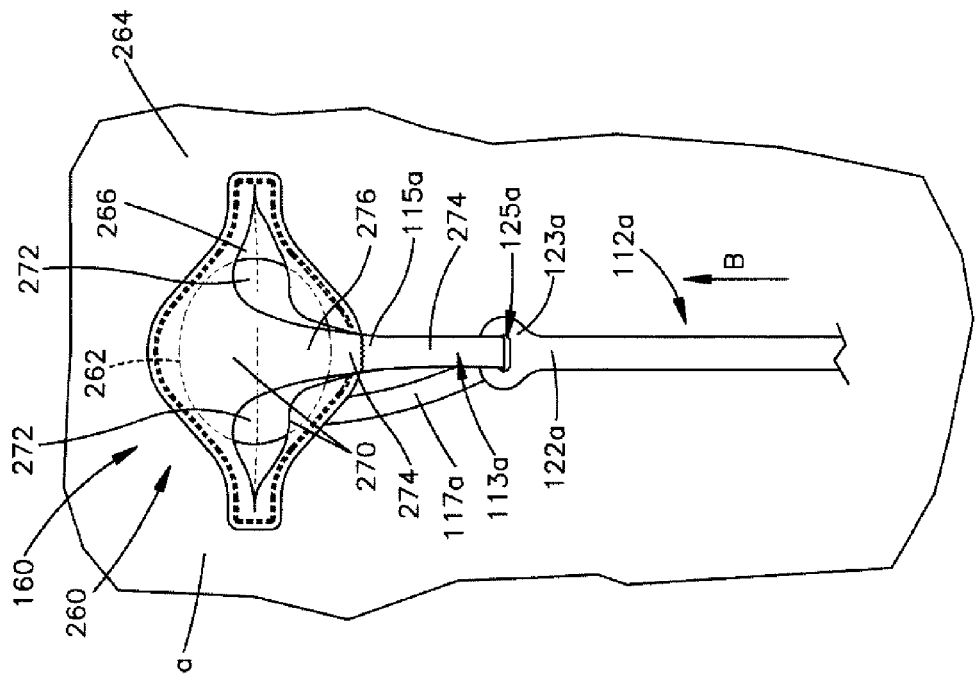
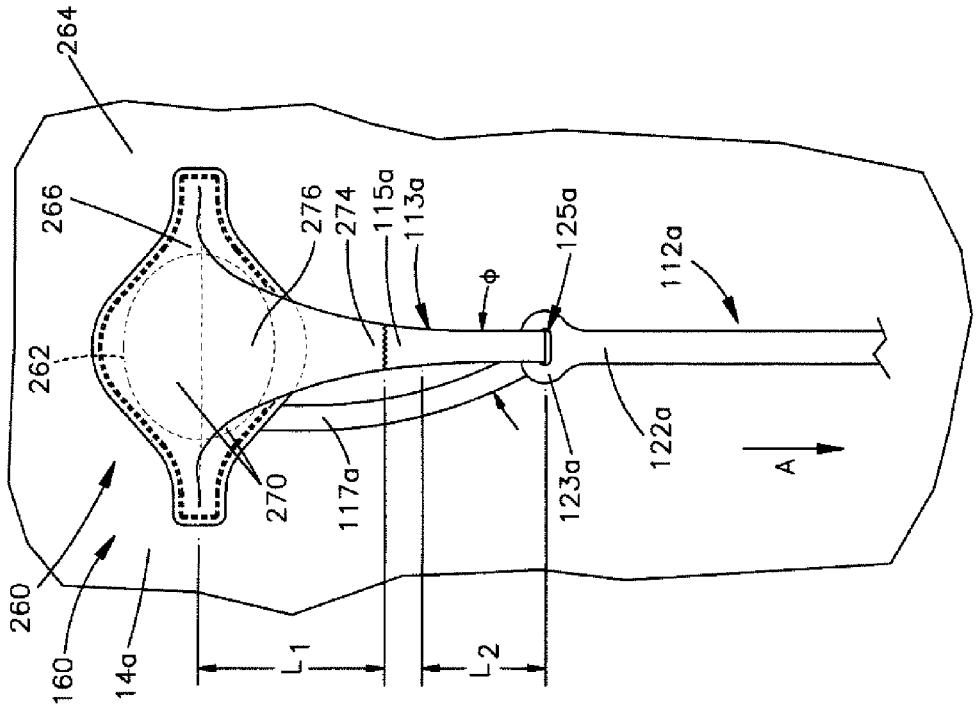

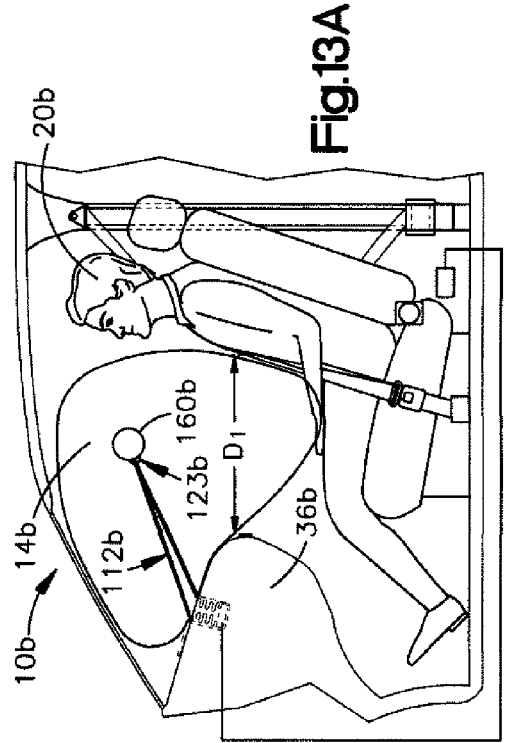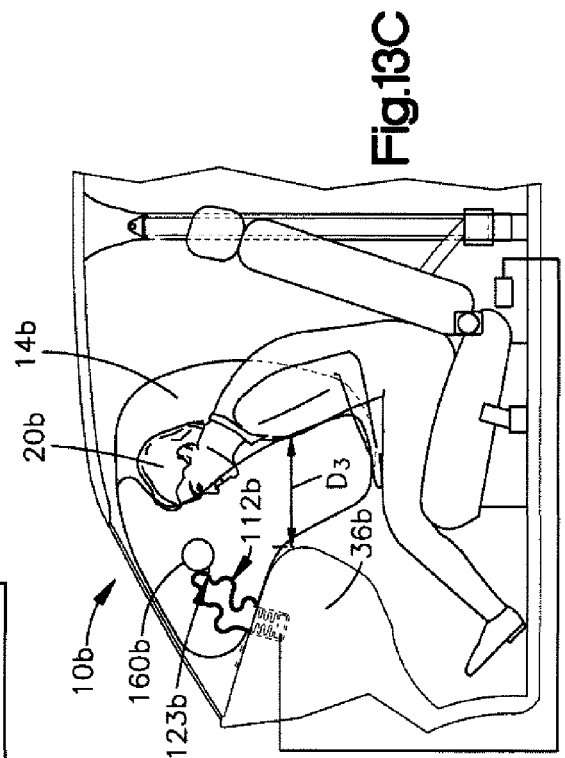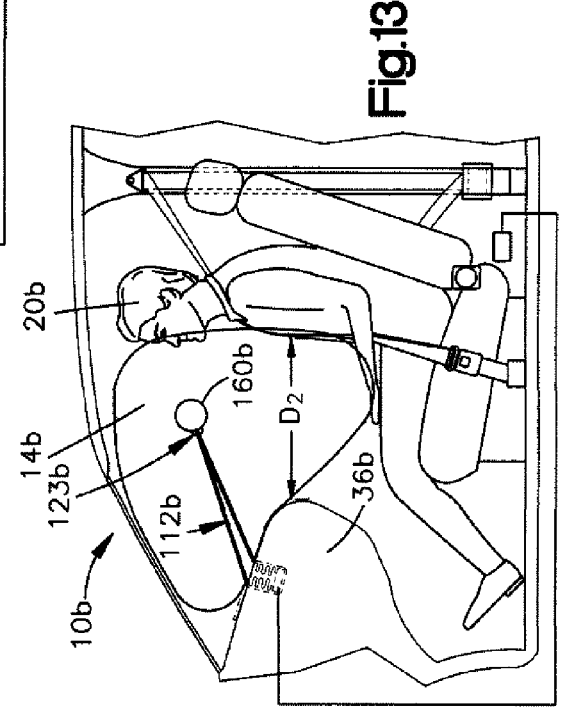

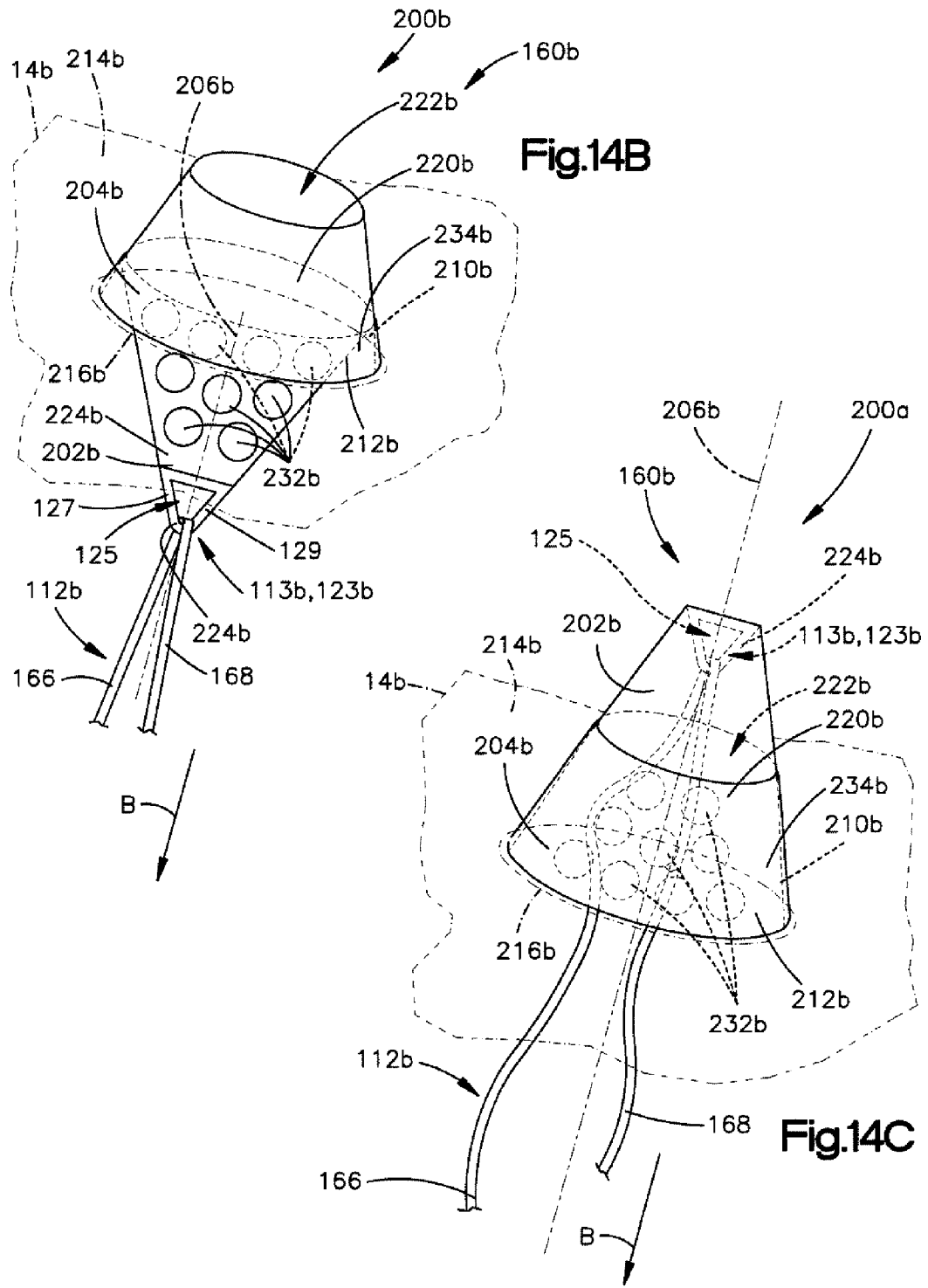

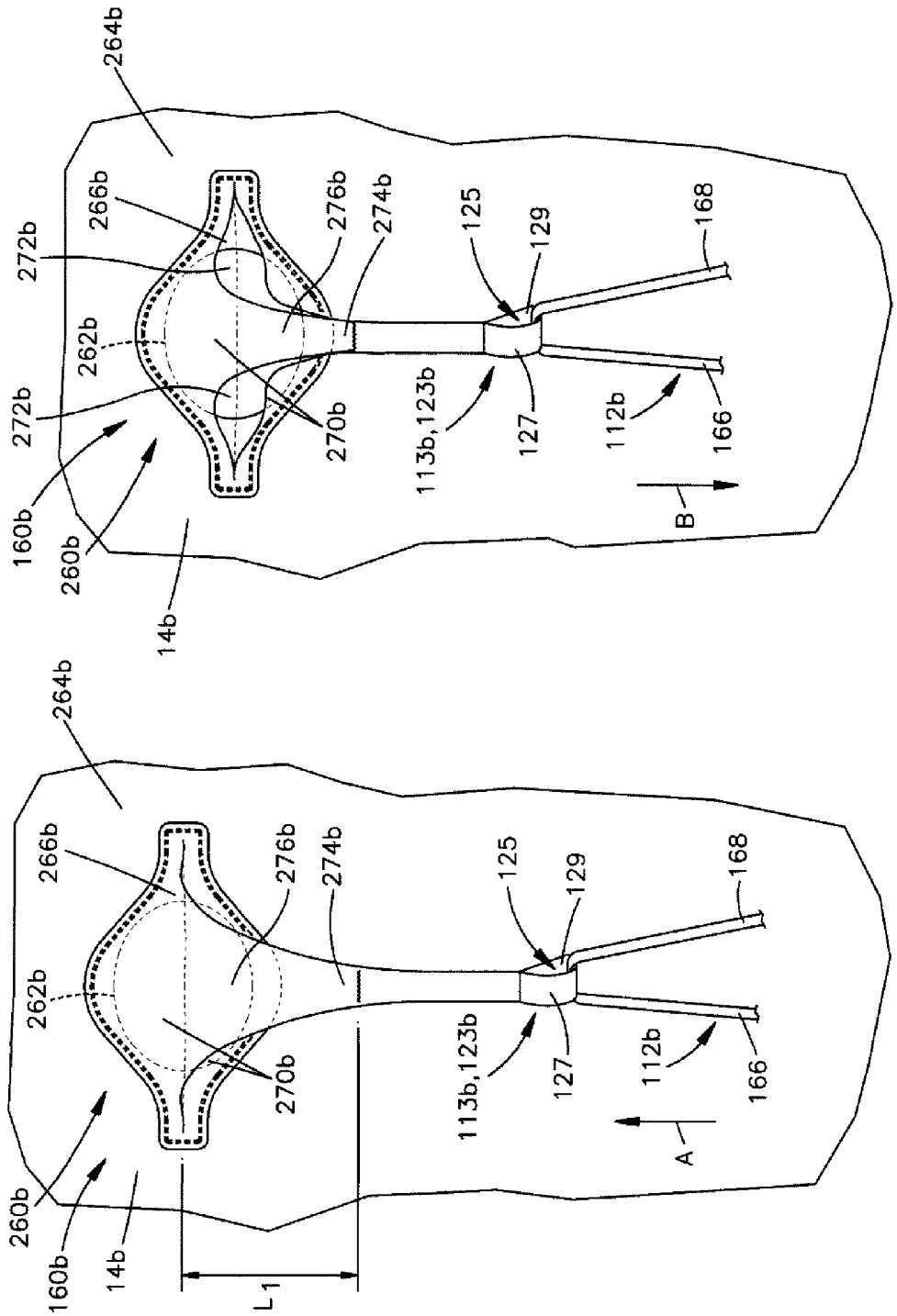

US 9,327,674 B2

PASSIVE AIR BAG VENT WITH GUIDE

FIELD OF THE INVENTION

The present invention relates to an apparatus for helping to protect an occupant of a vehicle and, in particular, relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

SUMMARY OF THE INVENTION

The invention relates to an apparatus for helping to protect an occupant of a vehicle. The apparatus comprises an inflatable vehicle occupant protection device that is inflatable between a vehicle surface and the vehicle occupant. The protection device includes a panel having a portion presented toward the occupant when the protection device is in an inflated condition. A vent has at least one opening for releasing inflation fluid from the protection device and has an actuated condition and a non-actuated condition. A guide tether is connected to the vent door and a vent tether is connected to the protection device. The vent tether includes a guide that is connected to the guide tether such that the guide and guide tether are slidable relative to one another. Tension on the vent tether applies tension to the guide tether for actuating the vent. The vent is configured to be initially in the non-actuated condition upon initial deployment of the protection device, with further deployment of the protection device to a predetermined degree causing the vent tether to act on the guide tether to place the vent in the actuated condition.

The present invention also relates to an apparatus for helping to protect an occupant of a vehicle. The apparatus comprises an inflatable vehicle occupant protection device that is inflatable between a vehicle surface and the vehicle occupant. The protection device includes a panel having a portion presented toward the occupant when the protection device is in an inflated condition. A vent has at least one opening for releasing inflation fluid from the protection device and has an actuated condition and a non-actuated condition. A guide is provided on the vent door. A vent is connected to the protection device and extends through the guide such that the vent tether and guide are slidable relative to one another. Tension on the vent tether applies tension to the guide for actuating the vent. The vent is configured to be initially in the non-actuated condition upon initial deployment of the protection device, with further deployment of the protection device to a predetermined degree causing the vent tether to act on the guide to place the vent in the actuated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a chart illustrating certain occupant characteristics under different vehicle operating conditions.

FIGS. 5A-5C are enlarged rear views of a portion of the apparatus of FIGS. 1 and 2, respectively.

FIGS. 11A-11C are enlarged views of a portion of the apparatus of FIGS. 6 and 7 in different conditions, according to another aspect of the invention.

FIGS. 13A-13C are schematic views illustrating different conditions of the apparatus of FIG. 12 having a different configuration.

FIGS. 14A-14C are enlarged views of a portion of the apparatus of FIG. 12 in different conditions, according to an aspect of the invention.

FIGS. 15A-15C are enlarged views of a portion of the apparatus of FIG. 12 in different conditions, according to another aspect of the invention.

DETAILED DESCRIPTION OF THE INVENTION

Figure 1:
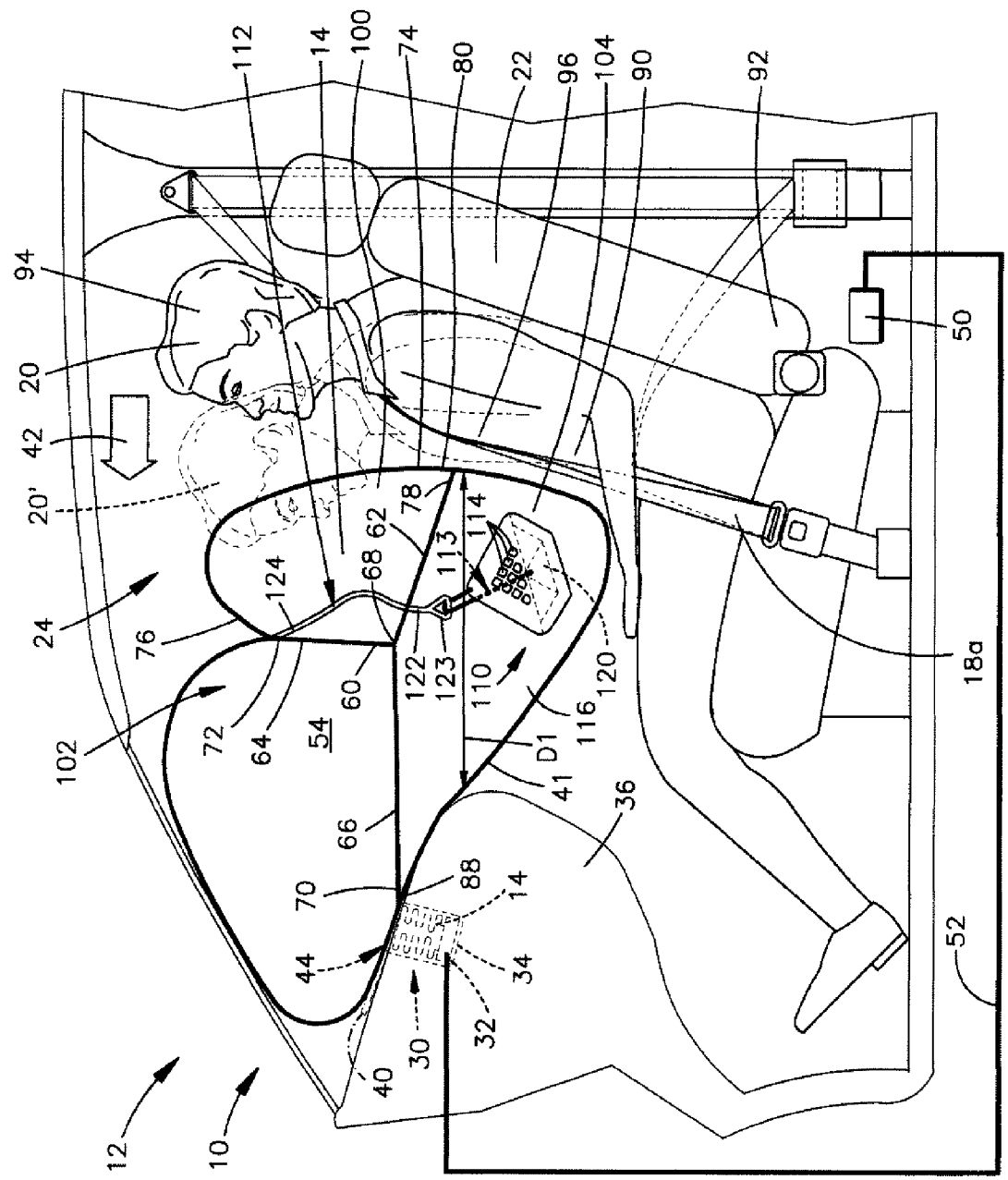
FIGS. 1 and 2 are schematic side views illustrating different conditions of an apparatus for helping to protect an occupant of a vehicle, according to an aspect of the invention.
Figure 2:
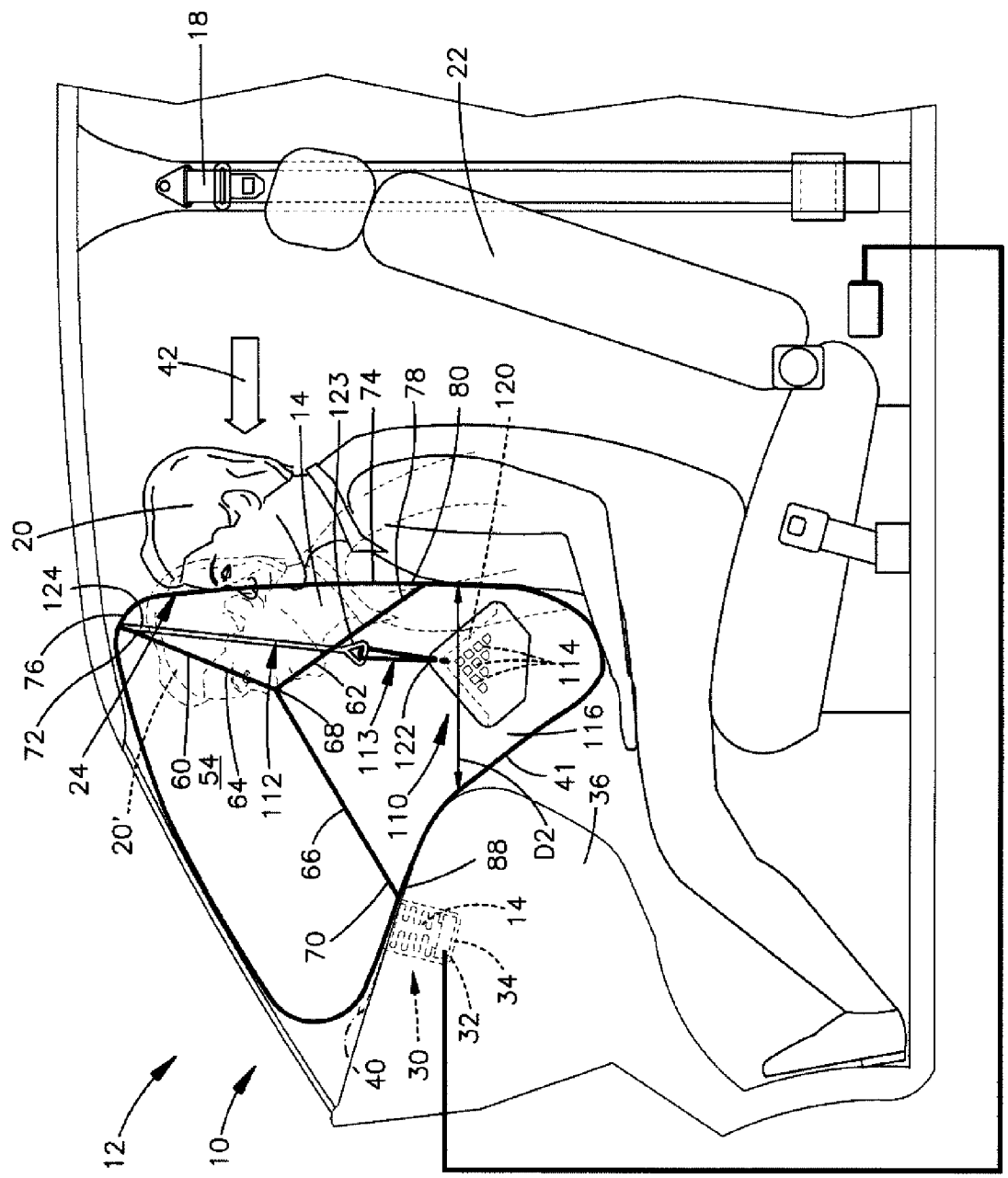

The present invention relates to an apparatus for helping to protect an occupant of a vehicle and, in particular, relates to an air bag inflatable between an instrument panel and a front seat occupant of a vehicle. FIGS. 1-2 illustrate an example of an apparatus 10 for helping to protect an occupant 20 of a vehicle 12 that includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12. As shown in FIGS. 1 and 2, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding or adhesives, to form the air bag. The air bag 14 may be uncoated, coated with a material, such as a gas impermeable urethane or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, while inflated, helps protect the vehicle occupant 20 from impacts with parts of the vehicle 12, such as the instrument panel 36.

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant is 20 moved forward, as indicated by the arrow labeled 42 in FIGS. 1 and 2, into engagement with the air bag 14.

The "penetration" of the occupant into the air bag 14 is the distance or degree to which the occupant 20 moves into the inflated depth of the air bag. In other words, the degree of penetration could be measured as the distance a given point on the front panel 74 is moved toward the instrument panel 36 by the penetrating occupant 20. For example, the degree of penetration in FIG. 2 can be calculated as the difference between the inflated depth labeled D1 in FIG. 1 and the penetrated depth labeled D2 in FIG. 2. Alternatively, penetration could be measured as the distance between a point on the front panel 74 and a fixed point on the instrument panel 36 or between a point on the occupant 20 (e.g. the occupant's chest) and a fixed point on the instrument panel.

Several factors determine the degree to which an occupant 14 penetrates the air bag 14. For example, the size or mass of the occupant 20, the speed at which the occupant strikes the air bag 14, the pressurization of the air bag, and whether or not the occupant is restrained by the seatbelt 18 all help determine the degree to which the occupant penetrates the air bag in a given deployment scenario. Some of these determining factors are illustrated in FIG. 3, which depicts chest to instrument panel air bag penetration for occupants that are different in size, that are belted versus unbelted, and that strike the air bag 14 at different speeds.

FIG. 3 illustrates penetration values for two differently sized occupants—a $50^{th}$ percentile male occupant (50% male) and a $5^{th}$ percentile female occupant (5% female). The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 95% female. The 5% female is thus a small female occupant.

FIG. 3 illustrates that whether the occupant is belted versus unbelted has an effect on occupant penetration into the air bag. As shown in FIG. 3, an unbelted 5% female occupant travelling at 25 mph penetrates the air bag approximately 200 mm more than a belted 5% female occupant traveling at 35 mph. Similarly, an unbelted 50% male occupant travelling at 25 mph penetrates the air bag well over 200 mm more (approximately 225 mm) than a belted 50% male occupant traveling at 35 mph. In fact, the unbelted 50% female traveling at 25 mph penetrates the air bag approximately 150 mm more than the belted 50% male occupant traveling at 35 mph.

Those skilled in the art will appreciate that much can be extrapolated from belted/unbelted data illustrated in FIG. 3. For example, a 50% 25 mph unbelted male will strike through the air bag and impact the instrument panel. A 5% 25 mph unbelted female will come within 50 mm of striking through the air bag and impacting the instrument panel. Due to the differing seat positions for the occupants, belted 50% male and 5% females travelling at 35 mph will come within about 200 mm of striking through the air bag and impacting the instrument panel. It will thus be appreciated that the difference between striking through and cushioning can be a matter of relatively short distances/positions. For example, if the seat position of the 50% male is 100 mm closer, the difference between strikethrough and non-strikethrough is 100 mm, which can easily be taken up if the occupant is somewhat taller or heavier, if the seatbelt is somewhat loose or if the vehicle is travelling at a somewhat higher rate of speed. It thus becomes very difficult to respond actively to the vast number of combinations of occupant size/weight, seat position, vehicle speed, and buckle conditions that may be present at the time of air bag deployment.

To account for this, the air bag 14 may have one or more actuatable features for helping to control or tailor inflation, deployment, and pressurization of the air bag in response to vehicle conditions, occupant conditions or both vehicle and occupant conditions. These features are actuatable passively in response to vehicle and occupant conditions at the time of inflation. Thus, in the illustrated embodiments, these features are actuatable without relying on active sensors and/or actuators, such as electrical or pyrotechnic actuators. According to the present invention, these features are actuatable passively in response to vehicle and occupant conditions at the time of inflation. Thus, in the illustrated embodiment, these features are actuatable without relying on active sensors and/or actuators, such as electrical or pyrotechnic actuators. Those skilled in the art will appreciate that certain ones of these features could be actuated actively, for example in response to conditions determined via active sensors.

Referring to FIGS. 1 and 2, the air bag 14 includes an adaptive tether 60 for adapting the configuration of the air bag 14 depending on one or more vehicle or occupant conditions in the vehicle 12. In the embodiment of FIGS. 1 and 2, the adaptive tether 60 is a three-leg tether having a first segment that serves as a trigger tether 62, a second segment that serves as a shaping tether 64, and a third segment that serves as an anchor tether 66. The trigger tether 62, shaping tether 64, and anchor tether 66 intersect and are interconnected at a common point 68 from which the tethers extend.

The anchor tether 66 has a first end portion 70 secured to the air bag 14 (e.g., to a rear panel 41 of the air bag) or to structure of the vehicle 12, such as the air bag module 30 (e.g., the canister 34) or the instrument panel 36, at an anchor point 88. The shaping tether 64 has a first end portion 72 secured to the air bag 14, for example to the front panel 74 of the air bag 14. In the embodiment illustrated in FIGS. 1 and 2, the first end portion 72 of the shaping tether 64 is connected to an upper portion 76 of the front panel 74 of the air bag 14. The trigger tether 62 has a first end portion 78 secured to the air bag 14, for example to the front panel 74 of the air bag 14. In the embodiment illustrated in FIGS. 1 and 2, the first end portion 78 of the trigger tether 66 is connected to a mid or lower portion 80 of the front panel 74 of the air bag 14.

The mid/lower portion 80 of the front panel 74 to which the trigger tether 62 is connected has a large surface area and radius of curvature (see FIG. 1) compared to the surface area and radius of curvature of the upper portion 76 of the front panel to which the shaping tether 64 is connected (see FIG. 2). The degree to which the surface area and radius of curvature of the upper portion 76 is smaller than that of the mid/lower portion 80 may be several fold. For the construction illustrated in FIGS. 1 and 2, the mid/lower portion 80 of the front panel 74 exerts a force on the trigger tether 62 that is greater than the force exerted on the shaping tether 64 by the upper portion 76 of the front panel.

When the air bag 14 inflates and deploys, the gas pressure in the bag acts normal to the surface of the panels defining the inflatable volume 54 of the bag. The gas pressure in the air bag 14, acting on the comparatively large surface area of the mid/lower portion 80, exerts a correspondingly large force on the trigger tether 62. Conversely, the gas pressure acting on the comparatively small surface area of the upper portion 76 exerts a correspondingly small force on the shaping tether 64. Due to this and the three-leg configuration of the tether 60, as shown in FIG. 1, the tether becomes tensioned between the front panel 74 and the anchor point 88 in a substantially straight line along the anchor tether 66 and the trigger tether 62. As a result, the force urged on the shaping tether 64 by the upper portion 76 is substantially overcome by the tensioning of the anchor tether 66 and trigger tether 62, which causes the shaping tether to restrict deployment of the upper portion 76, thus giving the air bag 14 the shape illustrated in FIG. 1.

According to the present invention, the adaptive tether 60 is responsive to vehicle conditions, occupant conditions or both vehicle conditions and occupant conditions to adapt the inflated condition of the air bag 14. Particularly, the tether 60 may adapt the inflation, deployment, configuration, shape, pressurization or a combination thereof, of the air bag 14. According to the embodiment of FIGS. 1-2, this control is implemented passively through the physical construction and configuration of the air bag 14 and the adaptive tether 60.

In particular, in the embodiment of FIGS. 1 and 2, the air bag 14 and adaptive tether 60 are constructed, configured, and arranged to adapt the inflated condition of the air bag 14 depending on whether the occupant 20 is restrained by the seatbelt 18 at the time the air bag 14 is deployed. This is beneficial because, as described above and with reference to the data shown in FIG. 3, an unbelted occupant penetrates into the air bag 14 to a greater extent and at a different location on the bag than a belted occupant.

As shown in FIG. 1, in the case of a belted occupant 20, the seatbelt 18 serves to help restrain the occupant 20. As a result, the belted occupant 20, especially the occupant's lower torso 90 and hips 92, are restrained from moving toward the instrument panel 36. This allows the air bag 14 to inflate and deploy with comparatively little resistance or inhibition from the occupant 20. As shown in dashed lines at 20', the belted occupant's head 94 and upper torso 96 penetrate into a middle portion 100 of the air bag 14. The middle portion 100 is positioned below an upper portion 102 of the air bag in the area where the end portion 72 of the shaping tether 64 is connected to the front panel 74. The middle portion 100 is also positioned above a lower portion 104 of the air bag 14, in the area where the end portion 78 of the trigger tether 62 is connected to the front panel 74. As shown in FIG. 1, the degree or distance to which the occupant 20' penetrates into the air bag 14 may be comparatively or relatively small.

As shown in FIG. 2, in the case of an unbelted occupant 20, the seatbelt 18 does not help restrain the occupant 20. As a result, the unbelted occupant 20, including the occupant's lower torso 90 and hips 92, are not restrained from moving toward the instrument panel 36. Thus, as the air bag 14 inflates and deploys in response to the vehicle impact, the occupant's entire body moves unrestrained toward the instrument panel 36. As shown in dashed lines at 20', when this occurs, the unbelted occupant 20 may also move upward as the occupant moves toward the instrument panel 36. This can occur for several reasons. The seat bottom may be inclined upward from rear to front, so the occupant 20, moving forward on the seat bottom, also moves upward. Also, the occupant 20, in moving forward, may also move from a reclined position to an upright position. Further, the occupant 20 may move upward off the seat (not shown) as he or she moves forward in the vehicle.

As shown in dashed lined in FIG. 2, the occupant's head 94 penetrates into the upper portion 102 of the air bag 14. The occupant's upper torso 96 penetrates into the middle portion 100 of the air bag 14. The occupant's lower torso 90 penetrates into the lower portion 104 of the air bag 14. The degree or distance to which the occupant 20' penetrates into the air bag 14 may be comparatively or relatively large or substantial when viewed in comparison with the belted occupant (see FIG. 1).

From the above, those skilled in the art will appreciate that the tether 60 of the embodiment of FIGS. 1 and 2 tailors the inflated condition of the air bag 14 in response to the buckled status of the vehicle occupant 20. In the case of the buckled occupant 20, the tether 60 helps maintain the configuration illustrated in FIG. 1, restraining the upper portion 102 from deploying fully while permitting the lower portion 104 to deploy fully. As a result, the air bag 14 is initially deployed and maintained in the configuration of FIG. 1, which is a low volume configuration in comparison with the configuration of FIG. 2. The low volume configuration of the air bag 14 in FIG. 1 requires a lesser volume of inflation fluid in order to achieve the desired inflation, deployment, and pressurization characteristics. This can help reduce the required size and cost of the inflator and also helps ensure reliability in inflation and deployment.

Since the unbuckled occupant is the worst case scenario, the inflator 32 is sized to provide a volume of inflation fluid sufficient to inflate, deploy, and pressurize the air bag 14 to the large volume inflated condition of FIG. 2 within the desired performance parameters. This being the case, the volume of inflation fluid delivered by the inflator 32 is certainly sufficient to inflate, deploy, and pressurize the air bag 14 to the small volume inflated condition of FIG. 1 within the desired performance parameters. Since the buckled occupant is the expected condition, the tether configuration of FIGS. 1 and 2 helps bolster the reliability of the apparatus.

In the case of the unbuckled occupant 20, the air bag 14 initially inflates toward the configuration where the tether 60 maintains the basic configuration illustrated in FIG. 1. The unbelted occupant 20, however, being unrestrained by the seatbelt 18, moves into engagement with the lower portion 104, moves the lower portion toward the instrument panel 36, thus relieving the force exerted on the trigger tether 62 by the mid/lower portion 80 of the front panel 74. As a result, this relieves the tension in the trigger tether 62 and anchor tether 64 between the front panel 74 and the anchor point 88. This causes the trigger tether 62 and anchor tether 66 to deflect, which allows the force exerted on the shaping tether 64 by the upper portion 76 of the front panel 74 to move the tether 60 to the condition illustrated in FIG. 2. When this occurs, the tether 60 releases the upper portion 102 of the air bag 14 to deploy fully to the position illustrated in FIG. 2. The upper portion 102, when in this position, is positioned to receive and cushion the unbelted occupant 20'. Those skilled in the art will appreciate that the degree to which the tether 60 releases the upper portion 102 of the air bag to deploy is proportional to the degree to which the occupant 20 penetrates the air bag 14.

Those skilled in the art will thus appreciate that, advantageously, the tether 60 of the present invention adapts the configuration of the air bag 14 depending on whether the occupant 20 is restrained by the seatbelt 18. The tether 60 tailors the configuration of the air bag 14 so that the air bag has a comparatively small volume while covering the space where the buckled occupant 20 (FIG. 1) strikes the air bag. Also, the tether 60 tailors the configuration of the air bag 14 so that the air bag has a comparatively large volume while covering the space where the unbuckled occupant 20 (FIG. 2) strikes the air bag.

The air bag 14 of the embodiment of FIGS. 1 and 2 also includes a vent 110 that is selectively actuatable to release inflation fluid from the inflatable volume 54 of the air bag 14. The vent 110 includes a vent tether 112 and a guide tether 113 that cooperate to actuate the vent 110 in response to at least one vehicle or occupant condition at the time the air bag is deployed. The vent 110 thus may selectively release inflation fluid from the air bag 14 depending on these conditions.

The vent tether 112 has a first end portion 122 secured to the guide tether 113 and a second end portion 124 secured to the air bag 14. The first end portion 122 of the vent tether 112 includes a guide 123 formed integrally therewith as a loop of material that defines an opening 125 (see FIG. 5A). Alternatively, the guide 123 may have a metal or plastic construction and be secured to the first end portion 122 of the vent tether 112 via ultrasonic welding, adhesives, heat bonding or mechanical fasteners (not shown). In one alternative example, the guide 123 is in the form of a metal/plastic D-ring or metal/plastic eyelet or grommet reinforcing a hole or aperture in the first end portion 122 of the vent tether 112.

In the embodiment of FIGS. 1 and 2, the second end portion 124 of the vent tether 112 is secured to the upper portion 76 of the front panel 74 of the air bag 14. More specifically, the second end portion 124 of the vent tether 112 may be connected to the upper portion 76 of the front panel 74 at or near the location where the end portion of the shaping tether 64 is connected to the upper portion.

Figure 5A:
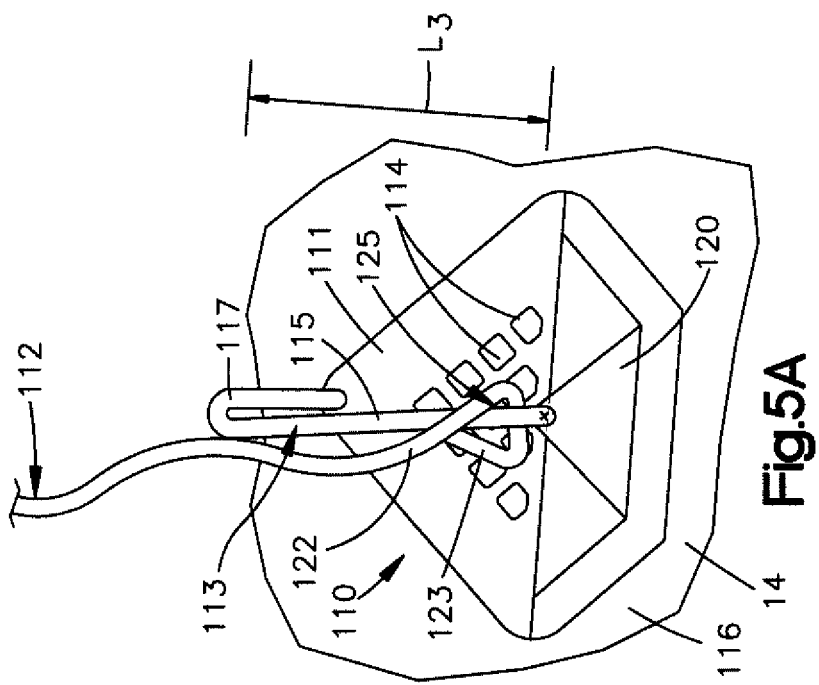

The vent 110 may have various configurations. The vent 110 of the embodiment illustrated in FIGS. 1 and 2 is detailed in FIGS. 5A-5C. Referring to FIGS. 5A-5C, the vent 110 includes a base 111 having one or more vent openings 114 formed in a panel 116, such as a side panel, of the air bag 14. A vent door 120 is secured to the side panel 116 of the air bag 14. The guide tether 113 has a first end portion 115 secured to the vent door 120 and a second end portion 117 secured to the base 111. The guide tether 113 extends through the opening 125 in the guide 123 of the vent tether 112 such that the guide tether and guide are slidable relative to one another through the opening. In other words, the guide tether 113 is looped through the opening 125 in the guide 123 and secured at both its end portions 115, 117 to the vent 110.

The vent door 120 is secured to the panel 116 by known means (not shown), such as stitching, ultrasonic welding, heat bonding or adhesives. The vent 110 has an open condition (FIG. 1) in which the vent door 120 is positioned away from the vent openings 114 and thereby permits inflation fluid to vent, i.e., flow, through the vent openings. In the open condition, the vent door 120 is folded away from the vent openings 114 and held in place by releasable means (not shown), such as tear stitching. When tension on the vent tether 112 and guide tether 113 secured thereto reaches a threshold magnitude, the tear stitching ruptures, which releases the vent door 120 to allow the vent door to move to the closed condition illustrated in FIG. 2. In the closed condition, the vent door 120 covers the vent openings 114 and thereby prevents inflation fluid from venting from the inflatable volume 54.

The vent 110 is constructed and arranged to adapt to vehicle conditions, occupant conditions or both in the vehicle 12 at the time the air bag 14 is deployed. More particularly, the vent 110 is constructed and arranged to adapt to whether the occupant 20 is belted or un-belted at the time of an event for which inflation of the air bag 14 is desired. This is because the vent tether 112, being connected to the upper portion 76 of the front panel 74 at or near the connection of the shaping tether 64, is configured to become tensioned in response to deployment of the upper portion. Consequently, this tension is transferred to the vent door 120 by the guide tether 113 connecting the vent tether 112 to the vent door.

Actuation of the vent 110 thus depends on deployment of the upper portion 76. The degree to which the vent 110 is actuated depends on the degree to which the upper portion 76 deploys. The degree to which the upper portion 76 deploys depends on whether the occupant 20 blocks/permits deployment which, in turn, depends on the occupant's size/position, the seat position, and whether the occupant is belted.

According to the embodiment of FIGS. 1 and 2, the vent 110 remains open and vents inflation fluid from the inflatable volume 54 in response to a belted occupant 20 (FIG. 1). Maintaining the vent 110 in the open condition in the case of the belted occupant 20 may be desirable. For example, since the belted occupant 20 is restrained by the seatbelt 18, it may be desirable to provide a lower degree of air bag pressurization to produce the necessary degree of energy dissipation and absorption.

Additionally, according to the embodiment of FIGS. 1 and 2, the vent 110 closes and blocks inflation fluid from venting from the inflatable volume 54 in response to an un-belted occupant 20 (FIG. 2). Maintaining the vent 110 in the closed condition in the case of the un-belted occupant 20 may also be desirable. For example, since the un-belted occupant 20 is not restrained by the seatbelt 18, it may be desirable to provide a higher degree of air bag pressurization to produce the necessary degree of energy dissipation and absorption.

From the above, those skilled in the art will appreciate that, according to the present invention, the adaptive tether 60 and the vent 110 in combination act to shape the air bag 14 and vent inflation fluid from the air bag in the event of a belted occupant 20, and act to shape the air bag and block inflation fluid venting in the event of an un-belted occupant. Advantageously, the adaptive shaping and venting achieved through the adaptive tether 60 and vent 110 are controlled passively and respond without the need to actively monitor the occupant or vehicle and without the need to actively actuate the tether or vent. The adaptive tether 60 and vent 110 respond to air bag deployment and the manner in which the occupant 20 strikes the bag.

As another advantage, by adjusting the relative lengths of the adaptive tether 60 and the vent tether 112 or by adjusting the relative positions at which the adaptive tether and vent tether are connected to the air bag 14, the air bag can be adapted to vent inflation fluid from the air bag when the bag is at a predetermined shape defined by the shaping tether 64. For example, the relative lengths of the tethers 60 and 112, the relative positions at which the tethers are connected to the air bag 14 or both the relative lengths and connection positions of the tethers could be adapted such that the vent 110 blocks inflation fluid venting at any time before or up to the time that the air bag reaches the fully inflated and deployed condition of FIG. 2. Therefore, although the vent 110 is illustrated as blocking inflation fluid venting when the air bag reaches the large volume condition of FIG. 2, the vent 110 could be adapted to block inflation fluid venting when the air bag reaches any degree of air bag inflation between the small volume condition of FIG. 1 and the large volume condition of FIG. 2.

Figure 4:
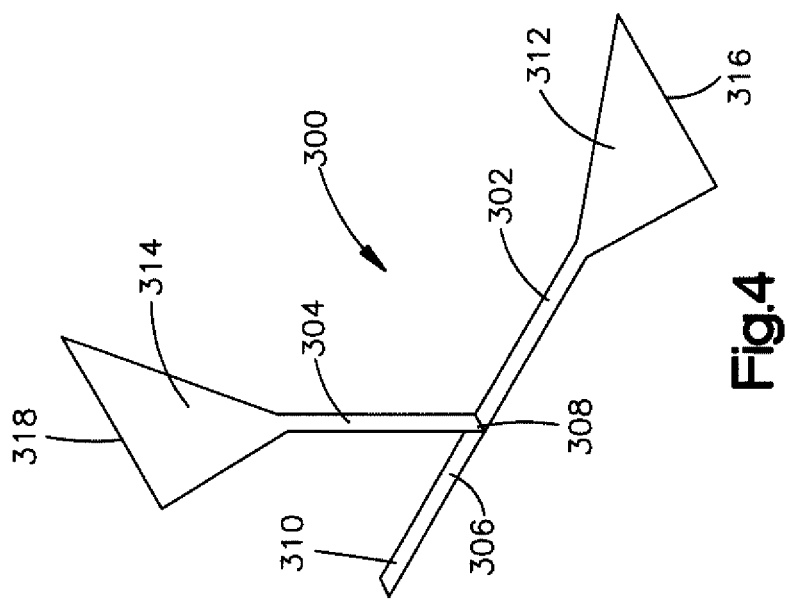
FIG. 4 is a schematic illustration of an adaptive tether of the apparatus of FIG. 1.

FIG. 4 illustrates an adaptive tether configuration that may be implemented in the embodiment of FIGS. 1-2 and therefore is representative of the tether 60. As shown in FIG. 4, the tether 300 is a three-leg tether that includes a first segment that serves as a trigger tether 302, a second segment that serves as a shaping tether 304, and a third segment that serves as an anchor tether 306. The trigger tether 302, shaping tether 304, and anchor tether 306 intersect and are interconnected at a common point 308 from which the tethers extend.

The anchor tether 306 has a first end portion 310 for being secured to the air bag 14 or to structure of the vehicle 12, such as the air bag module 30 or the instrument panel 36, at an anchor point. The trigger tether 302 has a first end portion 312 secured to the air bag 14, for example to a lower portion of a front panel of the air bag. The shaping tether 304 has a first end portion 314 for being secured to the air bag, for example to an upper portion of the front panel of the air bag.

As shown in FIG. 4, the first end portion 312 of the trigger tether 302 and the first end portion 314 of the shaping tether 304 have tapered configurations in which the end portions flare outward to widened terminal end edges 316 and 318, respectively. The widened terminal end portions 316 and 318 allow for connecting the trigger and shaping tethers 302 and 304 to a wide portion of the front panel 74 of the air bag 14. This helps distribute the forces applied to the front panel 74 by the trigger tether 302 and the shaping tether 304 across a wide area of the front panel so that the tethers shape the air bag 14 in a desired manner.

Referring to FIGS. 5A-5C, as the air bag 14 deploys, the vent tether 112 becomes elongated and tensioned as previously described based on vehicle conditions, occupant conditions or both. The guide tether 113, being connected to the guide 123, becomes tensioned when the vent tether 112 is tensioned. In particular, as the air bag 14 deploys, the guide tether 113 slides through the guide 123 and eventually both the vent tether 112 and guide tether become tensioned. The vent 110 is actuated and the vent door 120 closed when tension on the guide tether 113 reaches the threshold magnitude.

In the embodiment of FIGS. 1 and 2, the guide tether 113 cooperates with the guide 123 to increase the sensitivity with which the vent 110 is actuated while helping to prevent premature vent actuation. Referring to FIG. 5A, the vent tether 112 is in a slackened condition prior to actuation of the air bag 14. This may, for example, be the condition of the air bag 14 and vent 110 in the stored condition of FIG. 1. In this condition, the guide 123 is positioned adjacent to the connection of the guide tether 113 with the vent door 120. Upon actuation of the air bag 14, the deploying bag moves in the direction indicated generally at A. In response to this movement, the vent tether 112 is tensioned and the guide 123 slides along the guide tether 113 away from the vent door 120 in the direction A toward the condition shown in FIG. 5B.

Once the guide 123 reaches the position of FIG. 5B, further deployment of the air bag 14 tensions both the vent tether 112 and guide tether 113, and this tension acts on the tear stitching that holds the vent door 120 in the open condition. When the tension on the guide tether 113 reaches the predetermined magnitude, the tear stitching ruptures, and the guide tether slides through the guide 123, which allows the guide tether, vent tether 112, and vent door 120 to move to the closed condition of FIG. 5C.

In this configuration, the guide tether 113 cooperates with the guide 123 to increase the sensitivity of the vent 110 to deployment of the air bag 110. This sensitivity, referred to herein as "actuation sensitivity," relates specifically to the degree or distance of air bag deployment that is required to actuate the vent 110. Thus, in the "actuate closed" configuration of the vent illustrated in FIGS. 5A-5C, the actuation sensitivity of the vent 110 is related to the degree or distance of air bag deployment that is required to close the vent 110.

In this description, the "actuation distance" for a vent refers to the distance that a vent component, such as a vent door, must move in order to actuate the vent to the fully open and/or fully closed condition. Referring to FIGS. 5B and 5C, the actuation distance of the vent 110 is illustrated generally at $L_1$, and this distance refers to the distance that the vent door 120 moves from the non-actuated condition (FIG. 5B) to the actuated condition (FIG. 5C). In the embodiment of FIGS. 5A-5C, movement of the vent door 120 over the actuation distance $L_1$ is produced through the operation of the vent tether 112 and guide tether 113, as described above.

In the configuration of FIGS. 5A-5C, the guide tether 113 is looped through guide 123 in a manner similar to that of a tether or rope looped around a pulley. Acting much in the same manner as a pulley, movement or stroke of the vent tether 112 and guide 123 a given distance in the direction A, referred to herein as a "stroke distance," will consume or take-up a length of the first segment 115 of the guide tether 113 that is twice the stroke distance. The actuation sensitivity of the vent 110 can thus be expressed as a ratio of the actuation distance of the vent to the stroke distance required to fully actuate the vent. In the embodiment illustrated in FIGS. 5A-5C, the actuation distance is $L_1$ and the stroke distance is $L_1/2$, which is indicated generally at $L_2$. The ratio of actuation distance to stroke distance, i.e., the actuation sensitivity, is thus 2:1. In other words, 2 units distance of vent door 120 closure is produced through 1 unit distance of vent tether 112 stroke.

Due to this decrease in actuation sensitivity, the stroke of the vent tether 112 required to produce the take-up of the guide tether 113 sufficient to close the vent 110 is half of the actuation distance. Since actuation of the vent 110 is not necessary until the air bag 14 reaches a fully or substantially fully deployed condition, take-up of the guide tether 113 can be delayed until the air bag reaches a degree of deployment that is further than if the vent door 120 was actuated by a direct tether connection to the deploying air bag. In other words, since the guide 123 and guide tether 113 combination requires half the stroke distance to actuate the vent 110, guide tether take-up can be delayed until the air bag 14 and vent tether 112 deploy further a distance, i.e., about half the stroke distance. This delay translates to a delay in the onset of vent door 120 closure without impacting the deployment time for the air bag 14. The air bag 14 deploys just as quickly and vent closure can be achieved at the same stage of air bag deployment. The vent 110 is actuated at a later stage of air bag 14 deployment, but closes twice as rapidly due to the doubling effect that the guide 123 has on guide tether 113 take-up.

The increased actuation sensitivity of the vent 110 and the resulting delay provides several advantages, namely, the length of the guide tether 113 is increased to delay the onset of guide tether take-up. This maximizes the distance, illustrated generally at $L_3$ in FIGS. 5A and 5B, that the guide 123 travels over the guide tether 113 before becoming tensioned by the deploying air bag 14. This distance is referred to herein as the "slack length" of the vent 110. Maximizing the slack length reduces the possibility that the guide tether 113 can become tensioned prematurely, for example, during the initial stages of air bag 14 deployment when the folded and stored air bag, vent tether 112, and guide tether begin to unfold and unfurl.

Moreover, the increased actuation sensitivity of the vent 110 increases the resolution with which the air bag 14 and vent can passively discern between different vehicle and/or occupant conditions. Since the increased actuation sensitivity reduces the stroke distance of the vent tether 112 required for actuation, the vent 110 and air bag 14 can be configured to respond passively to smaller changes in the vehicle and/or occupant conditions in the vehicle. For instance, in a configuration where the vent tether 112 is connected to an air bag panel, such as a front panel (see FIGS. 1 and 2), so the vent 110 is actuated in response to the chest to instrument panel distance (see chart of FIG. 3), the difference in vent actuation versus non-actuation would be halved over a configuration that did not include the increased actuation sensitivity configuration disclosed herein. Thus, for example, the vent 110 could respond to a difference in chest to instrument panel difference of 50 mm instead of 100 mm which, viewing the chart of FIG. 3, is significant given that the difference between strikethrough versus non-strikethrough for a 50% male and 5% female is less than 50 mm at 25 mph. Similar advantages could be realized in discerning forward versus seated occupants, belted versus unbelted occupants, and occupants positioned out of a normally seated position.

Additionally, the looped or pulley configuration of the guide tether 113 and the guide 123 advantageously increase the tensioning force on the vent tether 112 required to actuate the vent 110, thereby helping to prevent premature actuation of the vent. Referring to FIG. 5B, it is clear that when the vent tether 112 is tensioned in the direction A by a force F the tensioning force is divided evenly between the two end portions 115, 117 of the guide tether 113 in the direction A. In other words, half the tensioning force F applied to the vent tether 112 acts on the first end portion 115, which acts on the vent door 120 tear stitching, and half the tensioning force F acts on the second end portion 117 secured to the base 111. Consequently, the degree of force F on the vent tether 112 required to rupture the tear stitching is doubled over a configuration in which the vent tether is secured directly to the vent door 120. This construction is advantageous in that it helps to ensure the vent door 110 does not actuate until or unless the air bag 14 fully deploys. In other words, the tear stitching and pulley connection between the guide tether 113 and guide 123 are configured such that any tension applied to the vent tether 112 prior to full deployment of the air bag 14 will be insufficient to rupture the vent door 120 tear stitching. As a result, premature actuation of the vent 110 can be avoided.

The spatial orientation of the guide tether 113 and/or the vent tether 112 relative to the vent 110 can be adjusted to adjust the actuation sensitivity and/or the amount of tensioning force F on the vent tether required to actuate the vent. FIG. 5B illustrates that the end portions 115, 117 of the guide tether 113 extend at an angle $\Phi$ relative to one another. The angle $\Phi$ dictates how displacement of and forces acting on the vent tether 112 transfer to the guide tether 113 and, thus, adjusting the angle $\Phi$ will vary the actuation sensitivity and/or vent actuation force F. Consequently, although the end portions 115, 117 are illustrated as being substantially parallel to one another, i.e., the angle $\Phi$ is roughly zero, one having ordinary skill in the art will appreciate that the angle $\Phi$ can be modified as desired to meet performance criteria. For example, the second end portion 117 of the guide tether 113 may be secured to the panel 116 at a location left or right of the position shown in FIG. 5B to increase the angle $\Phi$.

Figure 6:
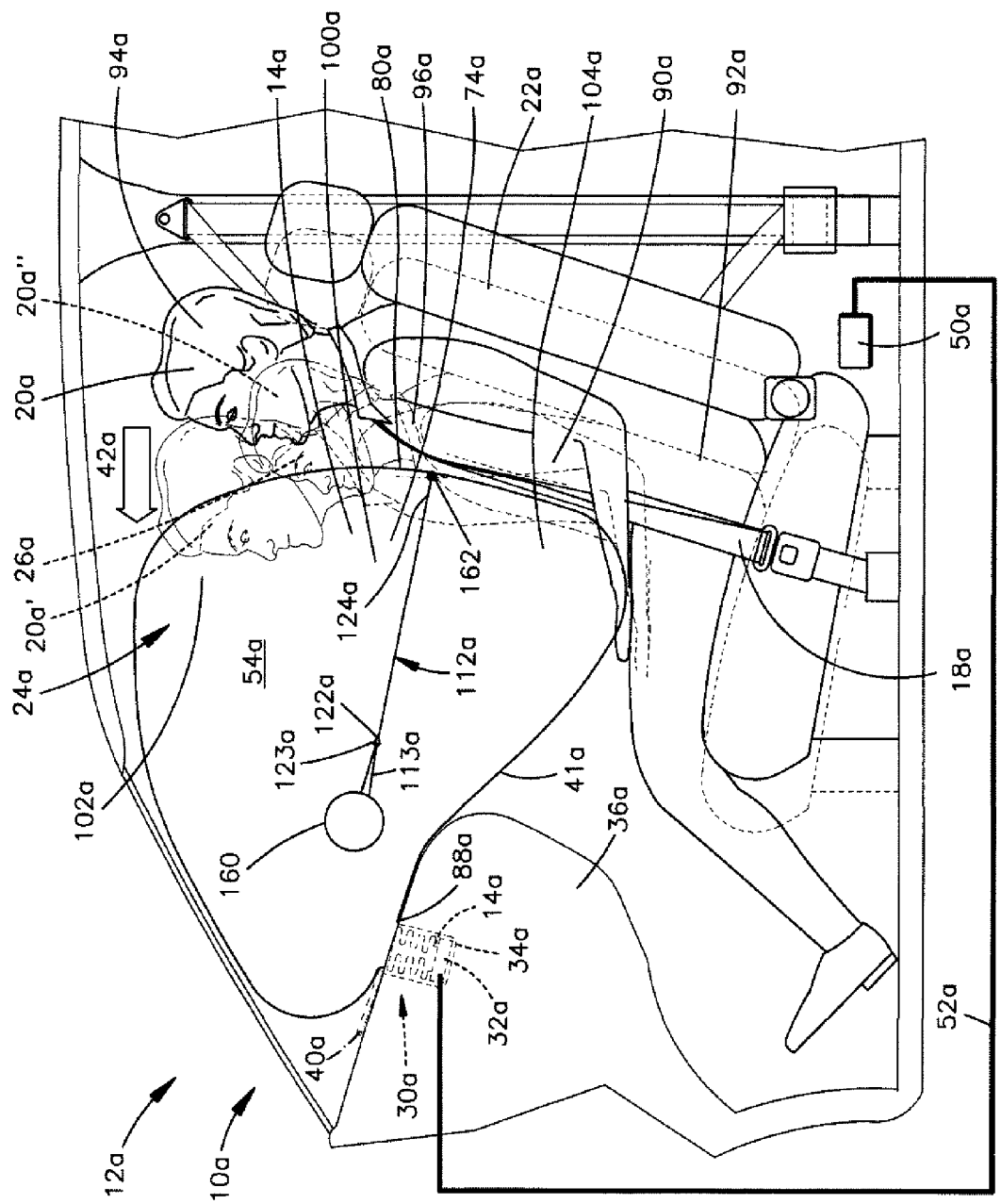
FIGS. 6 and 7 are schematic side views illustrating an apparatus for helping to protect an occupant of a vehicle, according to another aspect of the invention.
Figure 7:
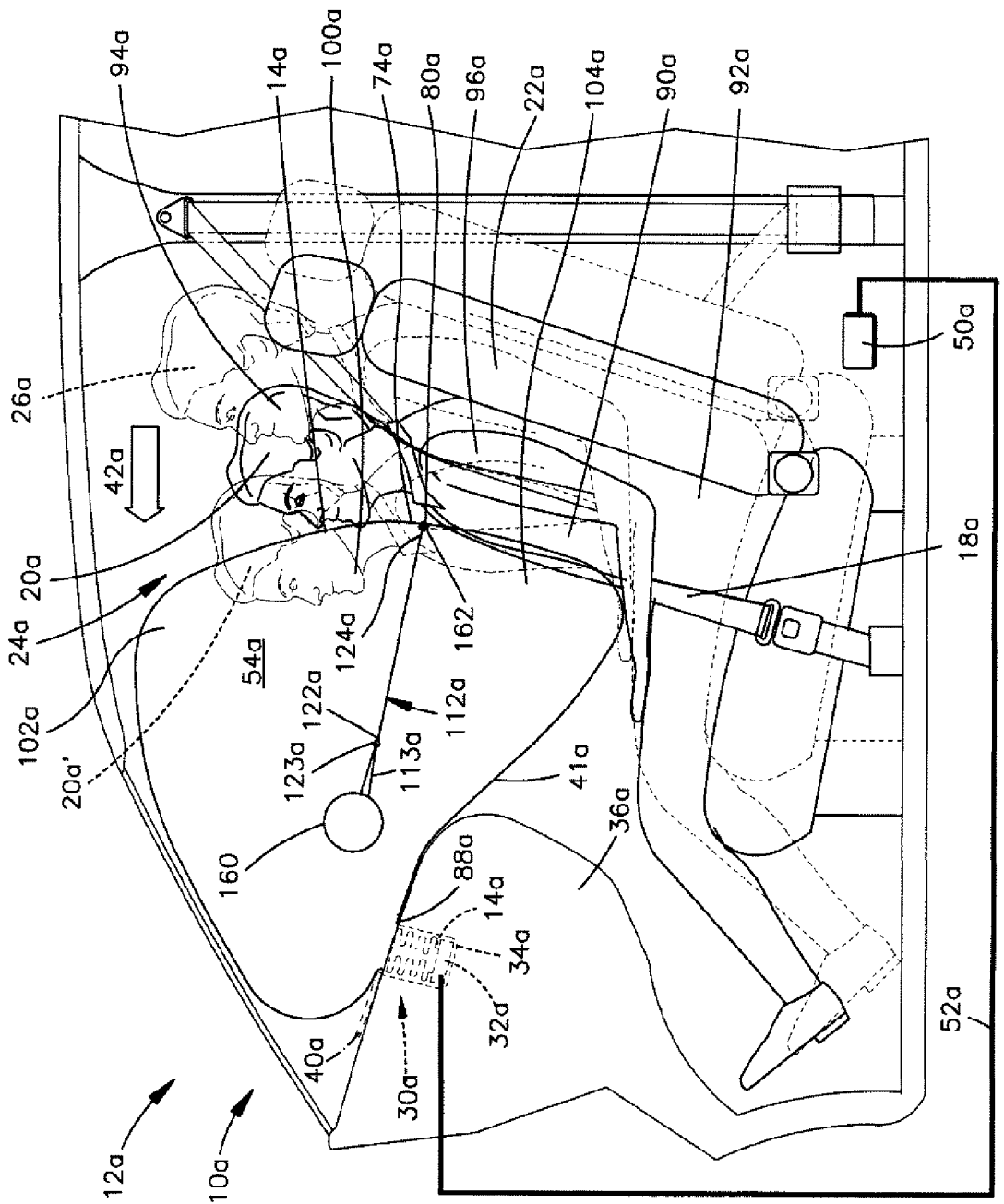

A second embodiment of the present invention is illustrated in FIGS. 6 and 7. Certain components in FIGS. 6 and 7 are similar or identical to components of FIGS. 1 and 2. The suffix "a" is added to the reference numbers of these similar or identical components in FIGS. 1 and 2 to avoid confusion. The embodiment of FIGS. 6 and 7 differs from the embodiment of FIGS. 1 and 2 in that the adaptive tether 60 is omitted and the vent tether and guide tether for the air bag of FIG. 6 and 7 cooperate to throttle the vent.

Referring to FIGS. 6 and 7, the air bag 14a includes the vent tether 112a for actuating a vent 160 for releasing inflation fluid from the inflatable volume 54a of the air bag 14a. The vent tether 112a is adapted to actuate the vent 160 depending on vehicle or occupant conditions in the vehicle 12a both at the time of deployment and during air bag 14a deployment. In the embodiment of FIGS. 6 and 7, the vent tether 112a comprises a single length of tether material having a first end portion 122a connected to the guide tether 113a and a second end portion 124a connected to the air bag 14a at a connection 162. The second end portion 124a may, for example, be connected to the middle portion 80a of the front panel 74a of the air bag 14a.

The tether 112a functions in cooperation with the guide tether 113a and the front panel 74a to be responsive to vehicle conditions, occupant conditions or both vehicle conditions and occupant conditions to control actuation of the vent 160. Particularly, the guide 123a on the vent tether 112a acts on the guide tether 113a, which throttles the vent 160 to help adapt the inflation, deployment, configuration, shape, pressurization or a combination thereof, of the air bag 14a. In the embodiment of FIGS. 6 and 7, this control is implemented passively through the physical construction and configuration of the air bag 14a, vent tether 112a, and guide tether 113a.

In particular, in the embodiment of FIGS. 6 and 7, the air bag 14a, vent tether 112a, guide tether 113a, and vent 160 are constructed, configured, and arranged to throttle the vent and thereby adapt the inflation, deployment, and pressurization of the air bag 14a depending on the penetration of the occupant into the air bag 14a. This is beneficial because vehicle/occupant conditions, such as the occupant size/weight, whether the occupant is belted or unbelted, the occupant's seat position (forward/rearward, upright/reclined), and the vehicle speed all affect the degree of occupant penetration into the air bag 14a. By adapting the air bag 14a passively in response to occupant penetration, there is no need for an active determination of all of these factors because all of these factors are accounted for inherently and automatically through the configuration and construction of the air bag.

In describing the function of the vent 160, the terms "actuated," "non-actuated," and "throttled" are used to identify different conditions of the vent. The actuated condition of the vent 160 refers to the condition of the vent when the tethers 112a, 113a are fully tensioned due, for example, to full or substantially full deployment of the air bag 14a. The non-actuated condition of the vent 160 refers to the condition of the vent when neither the vent tether 112a nor the guide tether 113a has been tensioned due to air bag 14a deployment to an extent sufficient to cause any significant change in inflation fluid flow through the vent. The throttled condition of the vent 160 refers to the condition of the vent where air bag displacement has been blocked, e.g., due to an out-of-position occupant 20a or altered, e.g., due to an occupant penetrating into the air bag, such that inflation fluid flow through the vent is altered.

FIG. 6 illustrates (in solid lines) an occupant 20a, such as a 50% male, in a normally seated and belted condition with the vehicle seat 22a in an upright mid-positioned (i.e., between full rear and full forward) condition. As shown in FIG. 6, in the illustrated case of a belted 50% male occupant 20a, the seatbelt 18a serves to help restrain the occupant 20. As a result, the belted occupant 20 is restrained from moving toward the instrument panel 36a. This allows the air bag 14a to inflate and deploy with comparatively little resistance or inhibition from the occupant 20a to a fully inflated and deployed condition. The vent tether 112a is thus tensioned, which tensions the guide tether 113a to place the vent 160a in its actuated condition. In FIG. 6, as shown generally at 20a', the belted occupant may bend forward and penetrate somewhat into the middle portion 100a or upper portion 102a of the air bag 14a.

The connection 162 does not move significantly in response to upper body penetration of the mid-positioned belted 50% male occupant 20a. As shown in FIG. 6 however, the degree or distance to which the occupant 20a' penetrates into the air bag 114a may be comparatively or relatively small. If circumstances, such as the severity of the event, the tightness of the seatbelt 18a or the position of the occupant 20a at the time the event occurs, result in further penetration of the occupant, the connection 162 may move toward the instrument panel 36a and the vent 160 may be throttled. Otherwise, the vent 160 may remain in its (fully) actuated condition and the air bag 14 is left to provide its intended cushioning and ride down effect.

In the illustration of FIG. 6, the occupant 20a does not penetrate significantly into the middle portion 100a of the air bag 14a where the connection 162 of the vent tether 112a is located. Therefore, in the case of the 50% male occupant illustrated in FIG. 6, the middle portion 100a of the air bag 14a including the connection 162 deploys fully, the tethers 112a, 113a become tensioned, and the tensioned tethers actuate the vent 160. This can be compared to the small occupant, such as a 5% female, which is shown in dashed lines at 20a".

FIG. 7 illustrates (in solid lines) an occupant 20a, such as a 5% female, in a normally seated and belted condition with the vehicle seat 22a in an upright forward positioned condition. The conditions in FIG. 7 are identical to those of FIG. 6, except the occupant is smaller and the vehicle seat 22a is in the forward position. In FIG. 7, the seatbelt 18a serves to help restrain the occupant 20a from moving toward the instrument panel 36a. As shown in dashed lines at 20a', similar to FIG. 6, the belted 5% female occupant may bend forward and penetrate into the air bag 14a.

FIG. 7 illustrates that the forward position of the vehicle seat 22a can make a significant difference in the deployment of the air bag 14a. The forward position of the vehicle seat 22a positions the occupant 20a closer to the instrument panel 36a such that the occupant blocks the air bag 14a from reaching the fully inflated and deployed position. Therefore, other conditions being equal, the 5% female occupant of FIG. 7 can experience penetration to a comparatively greater extent than the 50% male occupant (shown in dashed lines at 26). As a result, in the case of the 5% female occupant illustrated in FIG. 7, the air bag 14a and connection 162 are blocked from reaching full deployment. As a result, the tethers 112a, 113a may not fully actuate the vent 160. The vent 160 is thus throttled passively in accordance with the vehicle and occupant conditions that position the occupant 20a as shown in FIG. 7.

Those skilled in the art will appreciate that the difference in the fore/aft seat position between the 50% male in FIG. 6 and the 5% female in FIG. 7 may not be large. The difference may, for example, be as little as 50 mm. Since, however, it is the small, forward positioned 5% female (FIG. 7) that penetrates further into the air bag 14a, it is desirable to ensure that the vent 160 is throttled effectively and reliably. It is equally desirable that the vent 160 throttles differently in the case of the large mid/rear positioned 50% male occupant (FIG. 6) that does not penetrate significantly into the air bag 14a. This can be difficult, given the small difference in the positions of the two occupants.

To account for this, the combination of the guide tether 113a and the vent tether 112a and the position of the connection 162 allow not only for throttling the vent 160, but also for adjusting the sensitivity of the throttling. The vent 160 has an open condition (e.g., full-open), a closed condition (e.g., full-closed), and conditions between these two extremes in which the vent is partially opened/closed. "Throttling" as used herein is meant to refer to the fact that the degree to which the vent tether 112a and guide tether 113a, being configured for displacement and/or tension adjustments in response to occupant penetration, correspondingly controls, i.e., throttles, the degree to which the vent 160 is opened/closed. As the vent 160 moves between the full-open and full-closed condition and vice versa, the degree to which the vent is actuated (i.e., % opened or % closed) changes.

"Throttling sensitivity" as used herein is meant to the degree or rate at which the vent 160 is throttled in response to a given change in displacement/tension of the tethers 112a, 113a. As described above, displacement of the tethers 112a, 113a corresponds with the degree of occupant penetration into the air bag 14a at the location where the connection 162 is located on the first panel 74a. Thus, a vent tether 112a, guide tether 113a, and vent 160 configuration with comparatively high throttling sensitivity would produce a comparatively large change in vent throttling in response to a given change in tether displacement/tension. Similarly, a vent tether 112a, guide tether 113a, and vent 160 configuration with comparatively low throttling sensitivity would produce a comparatively small change in vent throttling in response to the same given change in tether displacement/tension. In this description, the throttling sensitivity is quantified as a ratio of vent tether 112a and guide tether 113a displacement to air bag 14a penetration distance by the occupant 20a ($D_T$:$D_P$).

In the embodiments of FIGS. 6 and 7, it should be noted that the tethers 112a, 113a remain tensioned even though, in FIG. 7, the occupant 20a penetrates the air bag 14a and moves the connection 162. This is because the vent 160 itself takes up the slack in the vent tether 112a and guide tether 113a as the occupant 20a penetrates the air bag 14a and the vent is throttled between the fully open and fully closed position.

The vent 160 may be configured such that the actuated condition of the vent is either an open condition or a closed condition. In this description, an "actuated open" vent 160 is closed at the time of deployment, and unrestricted air bag deployment tensions the vent tether 112a and guide tether 113a to actuate the vent (substantially or fully) opened. Occupant penetration into the protection device throttles the vent 160 back towards the closed condition. Additionally, in this description, an "actuated closed" vent 160 is open at the time of deployment, and unrestricted air bag deployment tensions the tethers 112a, 113a to actuate the vent (substantially or fully) closed. Occupant penetration into the protection device throttles the vent 160 back towards the open condition. Those skilled in the art will appreciate that the selection of an actuated open or actuated closed vent configuration can be based on a variety of factors, such as the position of the air bag (driver frontal/passenger frontal) and the desired cushioning and ride down characteristics. In other words, the vent 160 may have any actuated open or actuated closed configuration that is capable of performing with the vent tether 112a and the guide tether 113a to provide throttled venting in accordance with the description set forth above.

Figure 8A:
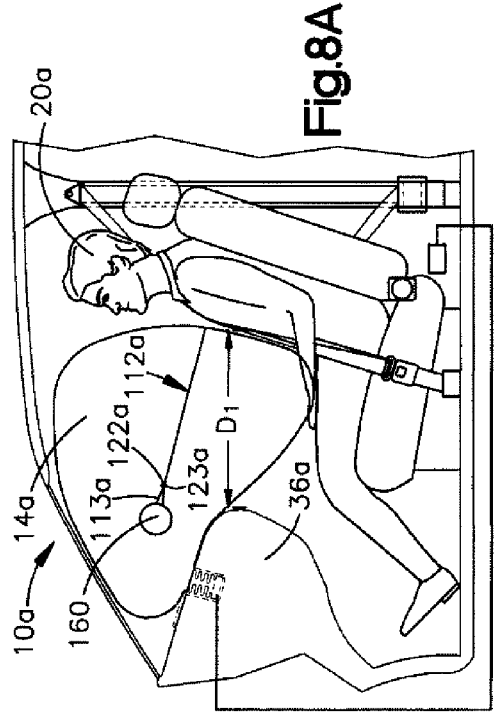
FIGS. 8A-8C are schematic views illustrating different conditions of the apparatus of FIGS. 6 and 7 having a different configuration.

Referring to FIG. 8A, when the air bag 14a is fully inflated and deployed, the tethers 112a, 113a become fully tensioned and fully actuate the vent 160. The vent 160 is configured such that an actuatable vent part (not shown in FIGS. 8A-8C) that controls fluid flow through the vent is urged to move in response to inflation fluid pressure in the air bag 14a. Inflation fluid pressure in the air bag 14a urges the vent 160a toward the non-actuated condition. The tethers 112a, 113a are configured such that tension on the vent tether acts on the guide tether to urge the actuatable vent part toward the actuated condition against inflation fluid pressure in the air bag 14a. Thus, when the air bag 14a is fully inflated and deployed, the tethers 112a, 113a overcome the urging that inflation fluid pressure places on the vent part and place the vent 160 in the fully actuated condition.

In this actuated condition, the occupant 20a is spaced from the air bag 14a and must move forward in order to engage and penetrate into the air bag 14a. This distance can be measured in terms of occupant chest to instrument panel (IP) distance, which is indicated at $D_1$ in FIG. 8A. The distance that the occupant 20a must travel before this engagement takes place can vary depending on the occupant/seat position prior to air bag deployment. When the vent 160 is throttled due to occupant penetration, the tethers 112a, 113a are tensioned directly between the front panel of the air bag 14a and the vent 160.

Figure 8C:
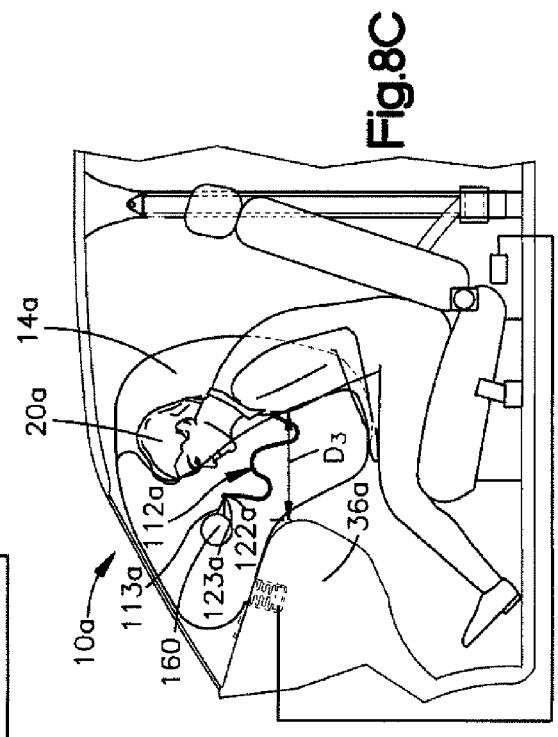
Figure 8B:
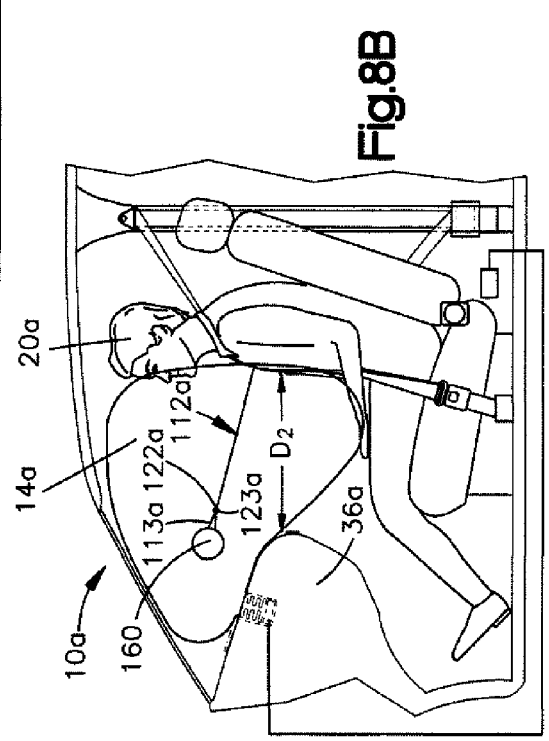

Referring to FIG. 8B, the occupant 20a has moved forward from the position illustrated in FIG. 8A. The chest to IP distance when this occurs is indicated at $D_2$ in FIG. 8B. The occupant 20a penetrates the air bag 14a and begins displacing the tethers 112a, 113a, which permits the actuatable vent member to move in response to fluid pressure in the air bag 14a, thus throttling the vent 160. As the vent 160 throttles between the actuated and non-actuated conditions, the tension on the vent tether 112a and guide tether 113a is maintained. As the degree of occupant penetration increases, the throttling of the vent 160 adjusts accordingly.

Referring to FIG. 8C, the occupant 20a has fully penetrated into the air bag 14a, having moved forward from the position illustrated in FIG. 8B. The chest to IP distance when this occurs is indicated at $D_3$ in FIG. 8C. Once the occupant 20a penetrates the air bag 14a to a degree such that the vent 160 is fully throttled to the non-actuated condition, tension on the tethers 112a, 113a is released, i.e., the vent tether and guide tether are slackened. At this point, since the vent 160 is in the non-actuated condition, further penetration does not affect the vent. If, for some reason, the occupant 20a moves in a direction that reverses the penetration, and inflation fluid pressure in the air bag 14a is still sufficient, the tethers 112a, 113a could again become tensioned and vent 160 throttling could resume.

The vent 160a may be an actuated open vent or an actuated closed vent. Examples of actuated open and actuated closed vent types are shown and described herein with reference to FIGS. 10A-10C and 11A-11C, respectively. The selection of an actuated open or actuated closed vent configuration can be based on a variety of factors, such as the position of the air bag (driver frontal/passenger frontal) and the desired cushioning and ride down characteristics. The actuated, non-actuated, and throttled conditions of the vents of FIGS. 10A-10C and 11A-11C correspond to the vehicle and occupant conditions illustrated in FIGS. 8A-8C according to Table 1:

TABLE 1

Figure 11C:
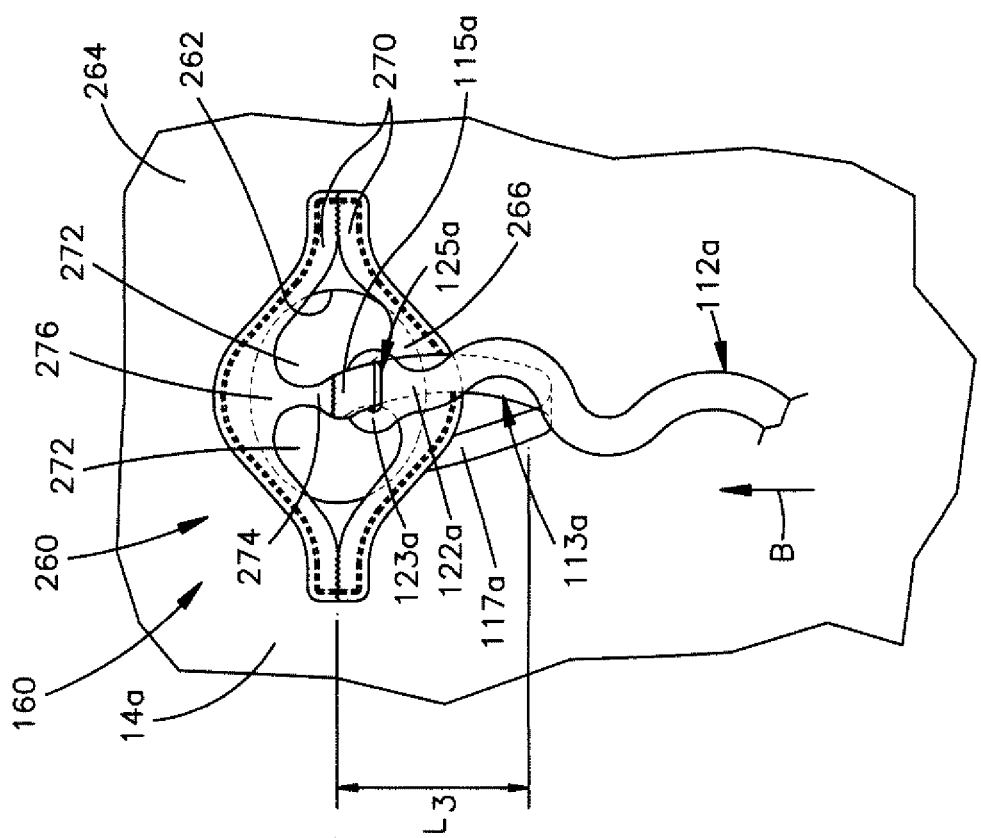

| Vent Condition | Actuated Open Vent FIGS. 9A-9C | Actuated Closed Vent FIGS. 11A-11C | Corresponding FIG. |
| --- | --- | --- | --- |
| Actuated | Open | Closed | FIG. 8A |
| Throttled | In Between | In Between | FIG. 8B |
| Non-Actuated | Closed | Open | FIG. 8C |

According to the present invention, the air bag 14a, vent 160, vent tether 112a, and guide tether 113a configurations disclosed herein advantageously are configured and tailored for multi-phase adaptive venting. The construction of the vent 160 (see, e.g., the vent 200 of FIGS. 10A-10C or the vent 260 of FIGS. 11A-11C), in combination with the various vent tether 112a and guide tether 113a configurations shown and described herein, permit adaptation not only with respect to how the vent is throttled in response to occupant penetration, but also how the vent responds prior to occupant penetration, the timing of the throttling response once occupant penetration begins, and the vent response dependent upon the vehicle/occupant conditions prior to penetration.

Figure 9:
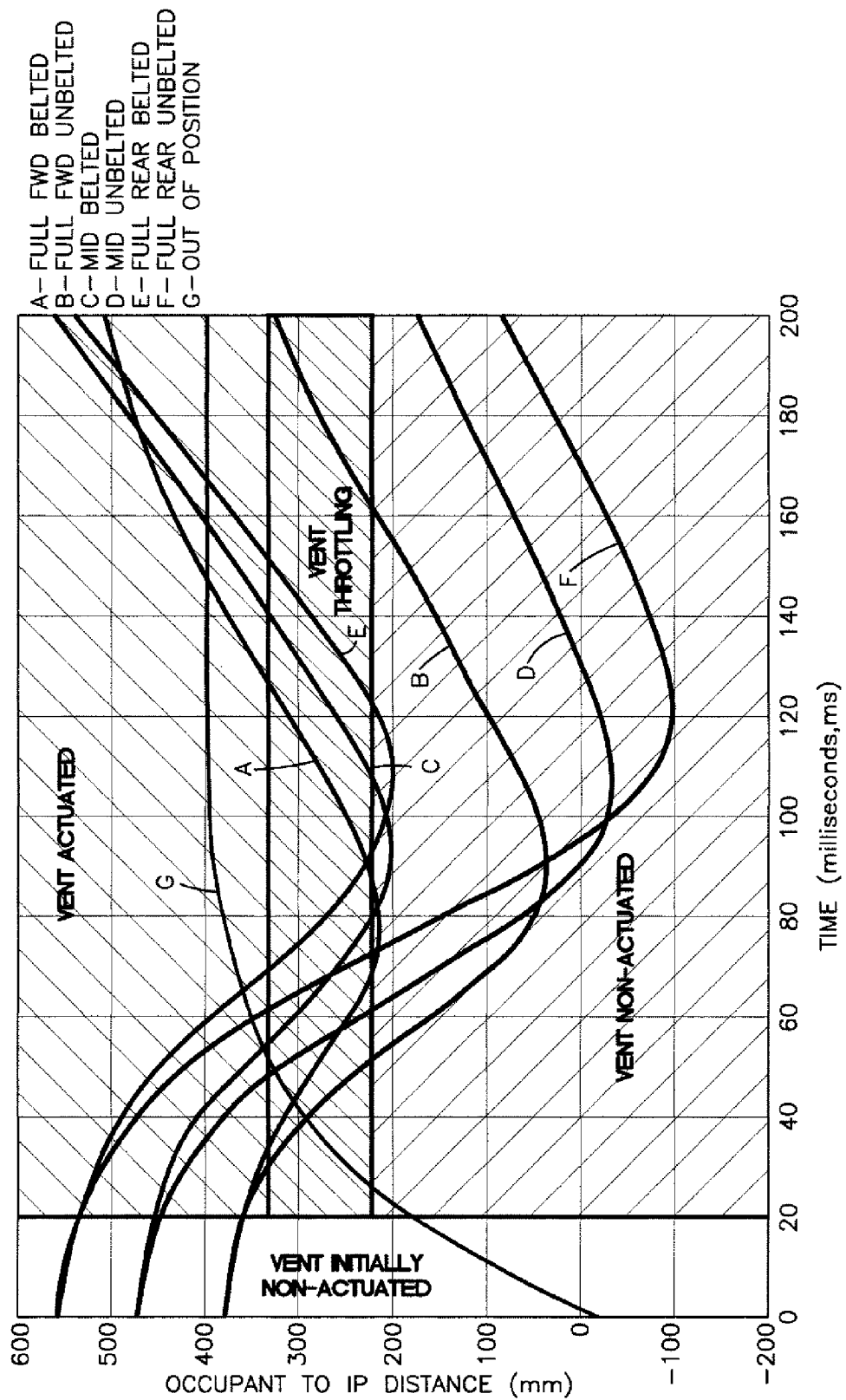
FIG. 9 is a chart illustrating certain occupant characteristics under different vehicle operating conditions and corresponding vent conditions associated with the vent configuration of FIGS. 8A-8C.

The apparatus 10a has several configurable features that help provide the multi-phase adaptive venting functionality. FIG. 9 illustrates the multi-phase adaptive venting functionality of the apparatus 10a of FIGS. 8A-8C, which features a single segment vent tether 112a. The chart of FIG. 9 illustrates occupant penetration in terms of occupant chest to IP distance versus time, where time=0 at the start of the impact event that triggers deployment of the air bag 14a. The various regions of the chart, which are bounded by bold lines, indicate the various vent conditions which, once the air bag 14a is deployed, depend on the occupant chest to IP distance. At time=0, the vent 160 is in the non-actuated condition. Uninhibited, the vent 160 is configured to transition to the actuated condition by time=20 ms. FIG. 9 illustrates how the apparatus 10a of the present invention is configured between the three phases/conditions of vent actuation—non-actuated, actuated, and throttling—in response to the vehicle and occupant conditions that are gauged in terms of occupant penetration, i.e., chest to IP distance.

The chart of FIG. 9 and the regions depicted thereon thus are specific to the configuration illustrated in FIGS. 8A-8C. Thus, as shown in FIG. 9, once the air bag 14a is deployed, occupant penetration (i.e., chest to IP distance) from 600 mm to approximately 330 mm will not affect the vent 160a, and the vent will remain in the actuated condition. Occupant penetration from approximately 330 mm to approximately 220 mm will throttle the vent 160a from the actuated condition toward the non-actuated condition. Once occupant penetration reaches approximately 220 mm, the vent 160a reaches the non-actuated condition and remains in the non-actuated condition as long as the occupant penetration is approximately 220 mm or less.

The various lines labeled A through G in FIG. 9 illustrate the operation of the apparatus 10a in response to varying vehicle and occupant conditions at the time of deployment of the air bag 14a of FIGS. 8A-8C. The line identified at A in FIG. 9 corresponds to a belted occupant 20a with a full forward seat position that produces an initial chest to IP distance (see FIG. 8A) of approximately 380 mm. This would correspond to a belted 5% female occupant. As shown in FIG. 9, the apparatus 10a is configured to respond to the full forward belted occupant with the vent 160 transitioning quickly to the throttling condition (i.e., within about 15 ms, at time≈35 ms, see FIG. 8B). The vent 160 throttles and reaches the non-actuated condition within about 35 ms, at time≈70 ms). The occupant penetrates into the air bag 14a, reaching maximum penetration of about 220 mm chest to IP at time≈75 ms (see FIG. 8C). The occupant 20a then rebounds and the vent 160a throttles at time≈90 ms back to the actuated condition at time≈125 ms. If there is sufficient pressure in the air bag 14a, the vent 160 may throttle back to the actuated condition. Any further impacts with the air bag 14a would thus occur with the vent 160 in the actuated condition, and any further ride-down would proceed with the vent throttling to the non-actuated condition at the penetration values dictated by the configuration of the apparatus 10a (i.e., throttling at 330 mm chest to IP, and non-actuated at ≈220 mm).

The line identified at B in FIG. 9 corresponds to an unbelted occupant 20a with a full forward seat position that produces an initial chest to IP distance of approximately 380 mm. This would correspond to an unbelted 5% female occupant. As shown in FIG. 9, the apparatus 10a is configured to respond to the full forward unbelted occupant with the vent 160a transitioning quickly to the throttling condition (i.e., within about 10 ms, at time≈30 ms). The vent 160 throttles and reaches the non-actuated condition within about 20 ms, at time 50 ms). The occupant penetrates into the air bag 14a, reaching maximum penetration of about 40 mm chest to IP at time≈90 ms. The occupant 20a then rebounds and the vent 160 throttles at time≈160 ms back toward the actuated condition at time≈200 ms. If there is sufficient pressure in the air bag 14a, the vent 160 may throttle back to the actuated condition.

The line identified at C in FIG. 9 corresponds to a belted occupant 20a with a mid seat position between full forward and full rearward that produces an initial chest to IP distance (see FIG. 8A) of approximately 470 mm. This would correspond to a belted 50% male occupant. As shown in FIG. 9, the apparatus 10a is configured to respond to the mid positioned belted occupant with the vent 160 transitioning to the throttling condition (i.e., within about 35 ms, at time≈55 ms, see FIG. 8B). The vent 160 throttles and reaches the non-actuated condition within about 25 ms, at time≈80 ms). The occupant penetrates into the air bag 14a, reaching maximum penetration of about 200 mm chest to IP at time≈90 ms (see FIG. 8C). The occupant 20a then rebounds and the vent 160 throttles at time 110 ms back to the actuated condition at time≈140 ms. If there is sufficient pressure in the air bag 14a, the vent 160 may throttle back to the actuated condition. Any further impacts with the air bag 14a would thus occur with the vent 160 in the actuated condition, and any further ride-down would proceed with the vent throttling to the non-actuated condition at the penetration values dictated by the configuration of the apparatus 10a (i.e., throttling at ≈330 mm chest to IP, and non-actuated at ≈220 mm).

The line identified at D in FIG. 9 corresponds to an unbelted occupant 20a with a mid seat position between full forward and full rearward that produces an initial chest to IP distance of approximately 470 mm. This would correspond to an unbelted 50% male occupant. As shown in FIG. 9, the apparatus 10a is configured to respond to the mid positioned unbelted occupant with the vent 160 transitioning to the throttling condition (i.e., within about 30 ms, at time≈50 ms). The vent 160 throttles and reaches the non-actuated condition within about 10 ms, at time 60 ms). The occupant penetrates into the air bag 14a, reaching maximum penetration of about −30 mm chest to IP at time≈110 ms. The −30 mm penetration is indicative of the unbelted occupant 20a impacting the instrument panel 36a. The occupant 20a then rebounds and the vent 160 throttles at time>200 ms back toward the actuated condition. If there is sufficient pressure in the air bag 14a, the vent 160 may throttle back to the actuated condition.

The line identified at E in FIG. 9 corresponds to a belted occupant 20a with a full rearward seat position that produces an initial chest to IP distance (see FIG. 8A) of approximately 560 mm. This would correspond to a belted 50% male occupant. As shown in FIG. 9, the apparatus 10a is configured to respond to the mid positioned belted occupant with the vent 160 transitioning to the throttling condition (i.e., within about 50 ms, at time≈70 ms, see FIG. 8B). The vent 160 throttles and reaches the non-actuated condition within about 20 ms, at time 90 ms). The occupant penetrates into the air bag 14a, reaching maximum penetration of about 200 mm chest to IP at time≈110 ms (see FIG. 8C). The occupant 20a then rebounds and the vent 160 throttles at time≈125 ms back to the actuated condition at time≈150 ms. If there is sufficient pressure in the air bag 14a, the vent 160 may throttle back to the actuated condition. Any further impacts with the air bag 14a would thus occur with the vent 160 in the actuated condition, and any further ride-down would proceed with the vent throttling to the non-actuated condition at the penetration values dictated by the configuration of the apparatus 10a (i.e., throttling at ≈330 mm chest to IP, and non-actuated at 220 mm).

The line identified at F in FIG. 9 corresponds to an unbelted occupant 20a with a full rearward seat position that produces an initial chest to IP distance of approximately 560 mm. This would correspond to an unbelted 50% male occupant. As shown in FIG. 9, the apparatus 10a is configured to respond to the rear positioned unbelted occupant with the vent 160 transitioning to the throttling condition (i.e., within about 40 ms, at time≈60 ms). The vent 160 throttles and reaches the non-actuated condition within about 10 ms, at time≈575 ms). The occupant penetrates into the air bag 14a, reaching maximum penetration of about −100 mm chest to IP at time≈120 ms. The −100 mm penetration is indicative of the unbelted occupant 20a impacting the instrument panel 36a. The occupant 20a then rebounds and the vent 160 throttles at time>200 ms back toward the actuated condition. If there is sufficient pressure in the air bag 14a the vent 160 may throttle back to the actuated condition.

The line identified at G in FIG. 9 corresponds to an occupant 20a leaning forward against the instrument panel 36a at time=0. As shown in FIG. 9, the apparatus 10a responds to the out of position occupant with the vent 160 remaining in the non-actuated condition from time=0 through time≈25 ms due to the out of position occupant inhibiting air bag deployment. At time≈25 ms, the vent 160 throttles due to air bag deployment and the occupant moving away from the instrument panel 36a. At time≈50 ms, the vent 160 reaches the actuated condition and remains in this condition beyond time=200 ms. Any further impacts with the air bag 14a would thus occur with the vent 160 in the actuated condition, and any further ride-down would proceed with the vent throttling to the non-actuated condition at the penetration values dictated by the configuration of the apparatus 10a (i.e., throttling at ≈330 mm chest to IP, and non-actuated at ≈220 mm).

The configuration of the apparatus 10a can affect the functionality of the vent 160. The effective area of the vent apertures in the vent 160 determines the volumetric flow rate of inflation fluid venting per unit throttling/penetration distance and, thus, the construction of the vent itself tailors the throttling effect on venting. This tailoring includes adjusting when the vent throttling begins and ends, the amount of penetration required to begin throttling, the amount of penetration required to completely throttle the vent, and the rate at which inflation fluid flows through the vent during throttling.

Figure 10A:
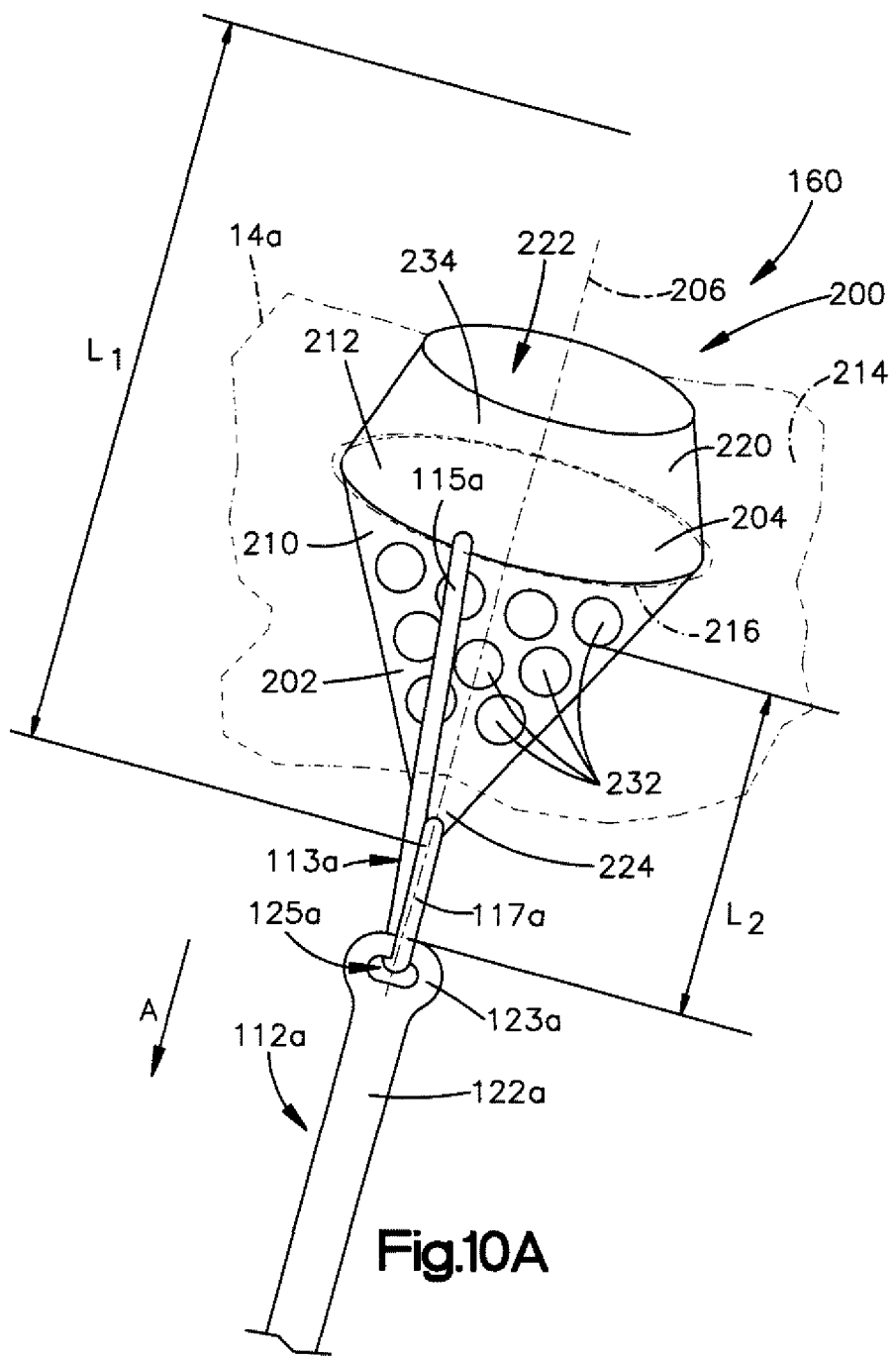
FIGS. 10A-10C are enlarged views of a portion of the apparatus of FIGS. 6 and 7 in different conditions, according to an aspect of the invention.
Figures 10B, 10C:
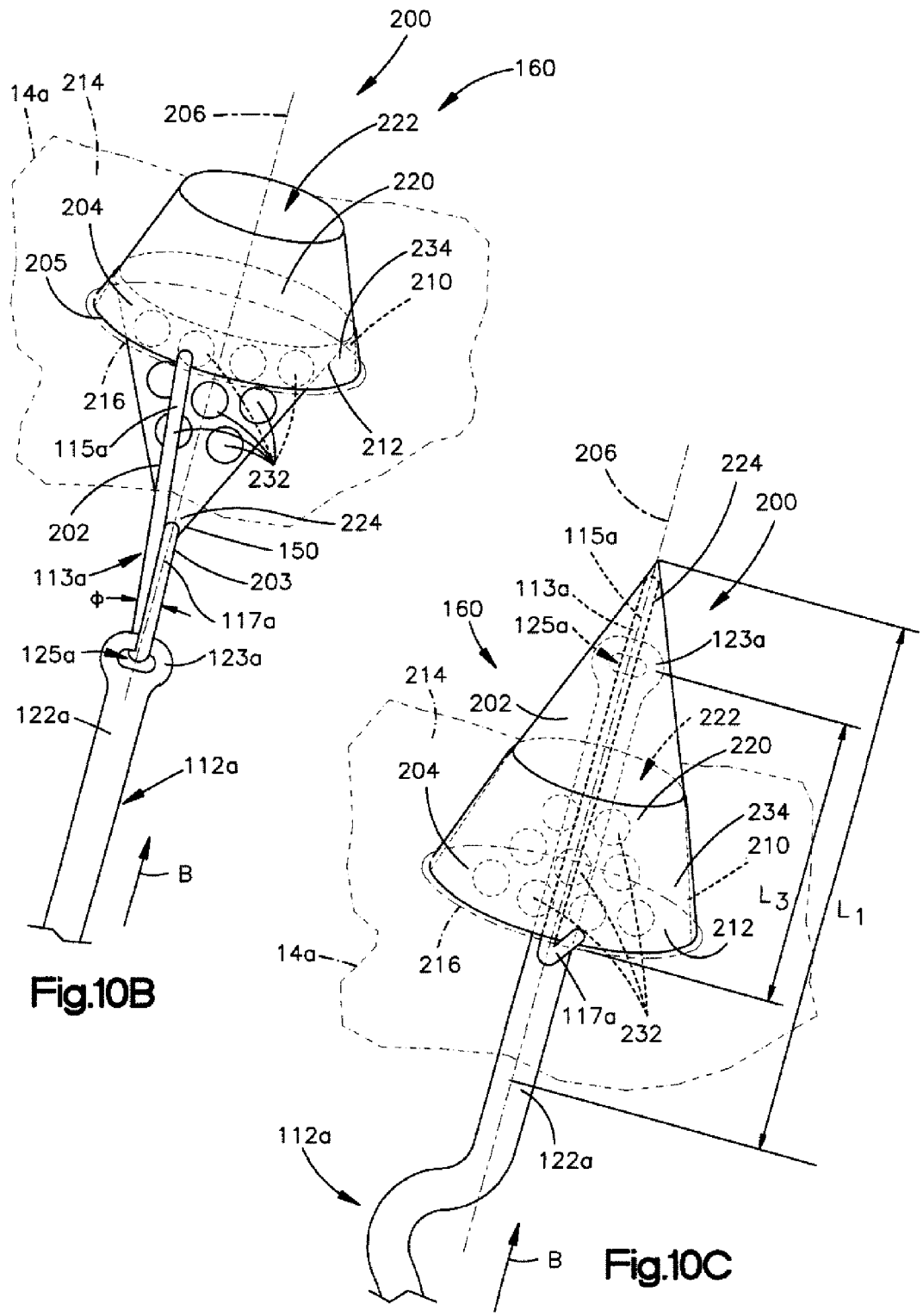

Examples of particular vent 160 constructions for use with the air bag 14a of FIGS. 6 and 7 are illustrated in FIGS. 10A-10C and FIGS. 11A-11C, respectively. Referring to FIGS. 10A-10C, the vent 160 is an actuated open vent 200 that is actuatable to release inflation fluid from the air bag 14a. In this embodiment, inflation fluid pressure in the air bag 14a acts to place/maintain the vent 200 in the closed condition at the time of deployment. The structure of the actuated open vent 200 is illustrated schematically in FIGS. 10A-10C. The vent 200 has a generally conical configuration forming a conduit that extends through an opening 216 in a panel or wall 214 of the air bag 14a, such as the side panel. The opening 216 has a shape that mates with the cross-sectional shape of the vent 200 at its interface with the wall 214. Thus, in the embodiment of FIGS. 10A-10C, the opening 216 in the air bag wall 214 is circular.

Referring to FIGS. 10A-10C, the vent 200 comprises a first portion comprising a conical inner wall 202 forming a vent door or vent member and a second portion comprising a frusto-conical outer wall 204. The inner and outer walls 202 and 204 share a common central axis 206. As shown in FIGS. 10A-10C, respective base portions 210 and 212 of the inner and outer walls 202 and 204 meet each other at the air bag wall 214, where they are connected to the air bag 14a about the periphery of the opening 216 in the wall 214. As shown in FIGS. 10A-10C, the inner and outer walls 202 and 204 may have congruent or substantially congruent configurations in which their respective base portions 210 and 212 have equal or substantially equal diameters, and the respective walls extend at equal or substantially equal angles with respect to the common axis 206.

The inner wall 202 tapers down from the base portion 210 and extends away from the air bag wall 214 into the inflatable volume of the air bag 14a. The outer wall 204 tapers down from the base portion 212 and extends away from the air bag wall 214 and away from the air bag 14 outside the inflatable volume of the air bag 14a, terminating at a closed end portion 224. The frusto-conical outer wall 204 has an open end portion 220 that defines an outlet 222 of the vent 200. The outer wall 204 defines a passage or discharge chamber 234 through which inflation fluid may travel en route to the outlet 222.

The inner wall 202 includes a plurality of vent openings 232 spaced about the circumference of the inner wall. In the embodiment illustrated in FIGS. 10A-10C, the openings 232 have a generally circular shape. The openings 232 could, however, have alternative configurations. For example, the openings could comprise elongated slots, X-shaped slits, cross-shaped slits, T-shaped slits, Y-shaped slits or other suitably shaped openings.

The guide tether 113a connects the first end 122a of the vent tether 112a to the vent 200. More specifically, the first end portion 115a of the guide tether 113a is secured to the base portion 212. The second end portion 117a is secured to the closed end portion 224. The guide tether 113a extends through and is slidably received in the opening 125a in the first end 122a of the tether 112a. The guide tether 113a is therefore looped through the opening 125a of the guide 123a on the vent tether 112a and secured at both its end portions 115a, 117a to the vent 200.

The actuated open vent 200 has an actuated open condition illustrated in FIG. 1 0A, a throttled intermediate condition illustrated in FIG. 10B, and a non-actuated closed condition illustrated in FIG. 10C. As the air bag 14a deploys, the vent tether 112a becomes elongated and tensioned as previously described based on vehicle conditions, occupant conditions or both. The guide tether 113a, being connected to the guide 123a, becomes tensioned when the vent tether 112a is tensioned. In particular, as the air bag 14a deploys, the guide 123a travels the slack length $L_3$ over the guide tether 113a before ultimately becoming tensioned. The vent 200 is throttled as the vent door 202 moves through the actuation distance $L_1$ due to movement of the vent tether 112a through the stroke distance $L_2$. The vent 200 is actuated to the open condition when the vent door 202 reaches the end of the actuation distance $L_1$ due to movement of the vent tether 112a to the end of the stroke distance $L_2$.

In the actuated open condition of FIG. 1 OA, the vent tether 112a acts on the guide tether 113a to actuate the vent 200, tensioning or otherwise pulling/maintaining the inner wall 202 in an open condition positioned at least partially within the inflatable volume 54a of the air bag 14a. The tensioned tethers 112a, 113a act against inflation fluid pressure in the air bag 14a, which urges the inner wall outward toward the closed condition of FIG. 10C. The tethers 112a, 113a are fully tensioned and are not displaced by a penetrating occupant. The condition of the vent 200 illustrated in FIG. 10A thus corresponds to the fully inflated and deployed condition illustrated in FIG. 8A and described in reference to FIGS. 8A-8C. In this condition, the tethers 112a, 113a substantially or completely prevent the inner wall 202 from entering the discharge chamber 234. In the open condition, fluid communication is established between the inflatable volume 54a and the atmosphere surrounding the air bag 14a via the vent openings 232, the discharge chamber 234, and the outlet 222.

In the throttled condition of FIG. 10B, tension on the tethers 112a, 113a is maintained but, due to a penetrating occupant, the air bag 14a has not reached the fully inflated and deployed condition. The condition of the vent 200 illustrated in FIG. 10B thus corresponds to the partial occupant penetration condition illustrated in FIG. 8B and described in reference to FIGS. 8A-8C. Due to the configuration of the vent 200, the pressure of inflation fluid in the air bag 14a urges the inner wall 202 into the discharge chamber 234. In the condition of FIG. 8B, the inner wall 202 is placed in a throttled condition in which the inner wall is partially inverted into the discharge chamber 234, blocking a portion of the vent openings 232 (shown in dashed lines) and leaving open the remaining vent openings (shown in solid lines). The vent 200 thus throttles inflation fluid flow through the partially blocked/partially unblocked openings 232. The pressure of inflation fluid in the air bag 14a presses the inner wall 202 against the blocked openings 232 and thereby forms an effective seal for blocking flow through those openings.

In the closed condition of FIG. 10C, the tethers 112a, 113a do not tension or otherwise pull/maintain the inner wall 202 in the open condition positioned within the inflatable volume 54a of the air bag 14a. In this condition, the guide 123a may be positioned along the slack length $L_3$. The non-actuated condition of the vent 200 illustrated in FIG. 10C thus corresponds to the high occupant penetration condition illustrated in FIG. 8C and described in reference to FIGS. 8A-8C. The inner wall 202 is thus free to move in response to inflation fluid pressure in the inflatable volume 54a of the air bag 14a. Under the pressure of inflation fluid in the inflatable volume 54a, the inner wall 202 moves to a closed condition positioned at least partially within the discharge chamber 234 defined by the outer wall 204. In the closed condition, the inner wall 202 is inverted from the open condition. Since the inner wall 202 and outer wall 204 have congruent or substantially congruent configurations, the inner wall 202 when in the closed condition mates with, overlies, and follows the contour of the outer wall 204, thereby forming a tight and close fit between the walls. Inflation fluid pressure in the air bag 14a maintains this fit and the resulting seal that blocks inflation fluid flow through the openings 232.

In the closed condition of the vent 200, the vent openings 232 are positioned against corresponding portions of the outer wall 204. Since the conical inner wall 202 is closed at the end portion 224, the inflation fluid pressure in the air bag presses the portions of the inner wall 202 surrounding the vent openings 232 against the corresponding portions of the outer wall 204. As a result, the outer wall 204 constrains the inner wall 202 and blocks or substantially blocks fluid communication between the inflatable volume and the atmosphere surrounding the air bag 14a. Inflation fluid venting is thus blocked in the non-actuated, closed condition of the vent 200.

Referring to FIGS. 11A-11C, the vent 160 is an actuated closed vent 260 that is actuatable to retain inflation fluid in the air bag 14a. In this embodiment, inflation fluid pressure in the air bag 14a acts to place/maintain the vent 260 in the closed condition at the time of deployment. The structure of the actuated closed vent 260 is illustrated schematically in FIGS. 11A-11C. The vent 260 includes one or more vent openings 262 formed in a panel 264, such as a side panel, of the air bag 14a. A vent door 266 is secured to the side panel 264 and covers the openings 262. The vent door 266 has one or more vent openings 272 formed therein. In the embodiment illustrated in FIGS. 11A-11C, the vent door 266 includes two vent openings 272. A strip 274 of material of the vent door 266 positioned between the vent openings 272 interconnects opposing cover flaps 276 of the vent door. The vent door 266 thus acts as an actuatable vent member. The first end portion 115a of the guide tether 113a is secured to the strip 274. The second end portion 117a of the guide tether 113a is secured to the side panel 264, which acts as the base of the vent 260. The guide tether 113a loops through the guide 123a on the first end portion 122a of the vent tether 112a to slidably connect the tethers to one another.

The vent door 266 is secured to the panel 264 by known means, such as stitching, ultrasonic welding, heat bonding or adhesives. In the illustrated embodiment, the vent door 266 itself includes separate panels 270 of material that are secured to each other by known means, such as stitching, to give the vent door the illustrated configuration. Those skilled in the art will appreciate that the vent door 266 could have alternative single panel or multiple panel constructions.

The actuated closed vent 260 has an actuated closed condition illustrated in FIG. 11A, a throttled intermediate condition illustrated in FIG. 11B, and a non-actuated open condition illustrated in FIG. 11C. As the air bag 14a deploys, the vent tether 112a becomes elongated and tensioned as previously described based on vehicle conditions, occupant conditions or both. The guide tether 113a, being connected to the guide 123a, becomes tensioned when the vent tether 112a is tensioned. In particular, as the air bag 14a deploys, the guide 123a travels the slack length $L_3$ over the guide tether 113a before ultimately becoming tensioned, with both the vent tether 112a and guide tether eventually becoming tensioned. The vent 260 is throttled as the vent door 266 moves through the actuation distance $L_1$ due to movement of the vent tether 112a through the stroke distance $L_2$. The vent 260 is actuated to the open condition when the vent door 266 reaches the end of the actuation distance $L_1$ due to movement of the vent tether 112a to the end of the stroke distance $L_2$.

In the closed condition of FIG. 11A, the vent 260 has a closed condition in which the tethers 112a, 113a are tensioned and not displaced by a penetrating occupant. In this condition, the guide 123a may be positioned along the slack length $L_3$. The condition of the vent 260 illustrated in FIG. 11A thus corresponds to the fully inflated and deployed condition illustrated in FIG. 8A and described in reference to FIGS. 8A-8C. In the closed condition of FIG. 11A, the tensioned tethers 112a, 113a extend along the air bag panel 264. In this condition, the cover flap portions 276 of the vent door 266 are tensioned, e.g., along the air bag panel 264. The shape and size of the cover flap portions 276 are configured such that, when tensioned, they close the vent openings 272 of the vent door 266 and cover the opening 262 in the air bag panel 264. In the closed condition of the vent 260, the vent door 266 thus blocks inflation fluid from exiting the air bag 14a.

In the throttled condition of FIG. 11B, the tethers 112a, 113a are tensioned, but somewhat displaced by a penetrating occupant. The condition of the vent 260 illustrated in FIG. 11B thus corresponds to the partial occupant penetration condition illustrated in FIG. 8B and described in reference to FIGS. 8A-8C. In this throttled condition, the displacement of the tether 112a, 113a caused by the partial penetration of the occupant, indicated generally by the arrow B, permits the cover flap portions 276 of the vent door 266 to bulge outward partially and assume a somewhat convex configuration. This allows the cover flap portions 276 of the vent door 266 to partially open the vent openings 272 under the pressure of inflation fluid in the air bag 14a. Thus, in the throttled condition of FIG. 11B, the vent 260 vents inflation fluid at a reduced, i.e., throttled, flow rate.

In the open condition of FIG. 11C, due to displacement by a penetrating occupant in the direction B, the vent tether 112a and guide tether 113a are not tensioned. In this condition, the guide 123a may be positioned along the slack length $L_3$. The condition of the vent 260 illustrated in FIG. 11C thus corresponds to the high occupant penetration condition illustrated in FIG. 8C and described in reference to FIGS. 8A-8C. In the opened condition of FIG. 11C, the tethers 112a, 113a are relaxed or slacked, thereby permitting the cover flap portions 276 of the vent door 266 to bulge outward fully and assume a convex configuration. In this condition, the vent openings 272 are opened due to the pressure of inflation fluid in the air bag 14a and thereby release inflation fluid from the air bag 14a through the openings 262 and 272.

Similar to the embodiment of FIGS. 1 and 2, the looped guide tether 113a slidably connected to the guide 123 and used with the vents 160 of FIGS. 10A-10C and FIGS. 11A-11C advantageously increases the actuation sensitivity of the vents 160 by providing an actuation distance $L_1$ to stroke distance $L_2$ ratio of 2:1. The looped guide tether 113a and guide 123 also help to prevent premature actuation of the vents 160 by 1) increasing the tensioning force F on the vent tether 112a required to actuate the vent, and 2) adding slack length $L_3$ to the vents.

Figure 12:
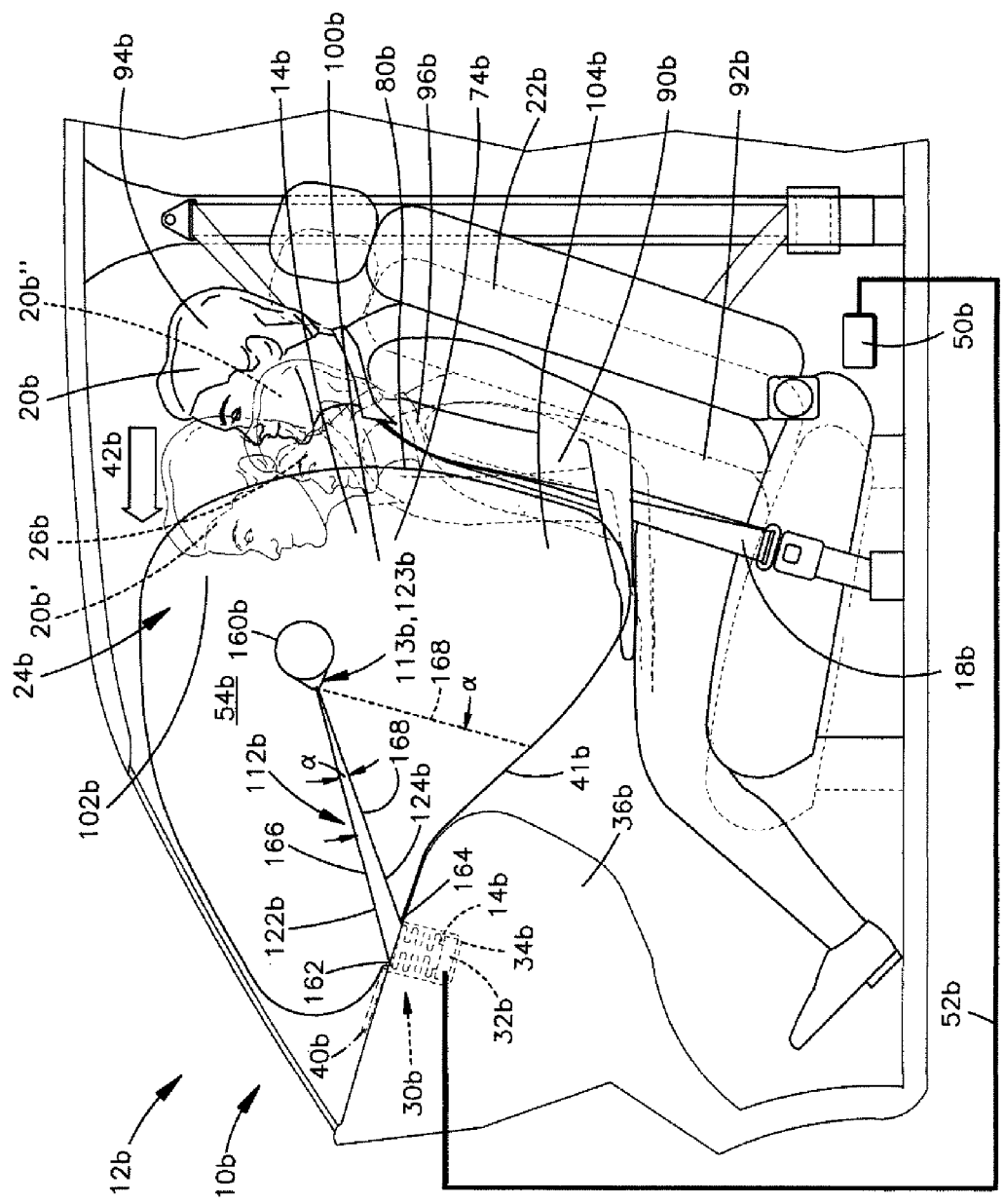
FIG. 12 is a schematic side view illustrating an apparatus for helping to protect an occupant of a vehicle, according to another aspect of the invention.

A third embodiment of the present invention is illustrated in FIG. 12. Certain components in FIG. 12 are similar or identical to components of FIGS. 6 and 7. The suffix "b" is added to the reference numbers of these similar or identical components in FIGS. 6 and 7 to avoid confusion. The embodiment of FIG. 12 differs from the embodiment of FIGS. 6 and 7 in that the vent 160b is located nearer the front panel 74b of the air bag 14b and is connected to the rear panel 41h or side panel 264b of the air bag by an adaptive vent tether 112b for actuation thereof. Furthermore, the guide tether 113b of FIG. 12 is formed integrally with the vent 160b. Similar to the guide tether 113a and guide 123a in the embodiment of FIGS. 6 and 7, the looped vent tether 112b used with the guide 123b of FIGS. 14A-14C and FIGS. 15A-15C advantageously provide a mechanical advantage to both closing and opening of the vent 160b in the manner described above.

In the embodiment of FIG. 12, the adaptive vent tether 112b comprises a single length of vent tether material that has a first connection 162 connecting a first end portion 122h of the vent tether. The first connection 162 may, for example, connect the first end portion 122b of the vent tether 112b to the rear panel 41b of the air bag 14b or to a portion of the air bag module 30b, such as the housing 34b. The vent tether 112b has a second connection 164 spaced from the first connection 162 and connecting a second end portion 124b of the vent tether. The second connection 164 may, for example, connect the second end portion 124b of the vent tether 112b to the rear panel 41h of the air bag 14b or to a portion of the air bag module 30b, such as the housing 34b.

As shown in FIG. 12, the vent tether 112b extends from the rear panel 41b of the air bag 14b, through the guide tether 113b, and back to the rear panel. The guide tether 113b is formed integrally with the vent 160b and permits the vent tether 112b to slide or otherwise move through its structure. The guide tether 113b divides the vent tether 112b into a first segment 166 and a second segment 168.

In the embodiment shown in FIG. 12, the vent tether 112b and guide 123b are configured such that the first and second segments 166 and 168 extend at a tether angle α relative to each other. As shown, the segments 166, 168 extend substantially parallel to one another and, thus, it would be easy to recognize that occupant penetration into the air bag 14b that results in movement of the guide tether 113b of X millimeters toward the instrument panel 36b would produce a corresponding shortening in the vent tether 112b by X millimeters. Thus, according to the invention, the vent tether 112b and guide 123b may be configured to produce a comparatively low throttling sensitivity, approaching 1:1 ($D_T$:$D_P$).

If the segments 166 and 168 were configured to extend at a substantially larger angle α relative to each other, shown in phantom in FIG. 12, it would be easy to recognize that occupant penetration into the air bag 14b that results in movement of the guide tether 113b of X millimeters toward the instrument panel 36b would produce a corresponding shortening in the vent tether 112b by 2X millimeters as each segment 166, 168 shortens by X millimeters. Thus, according to the invention, the vent tether 112b and guide 123b may be configured to produce a comparatively high throttling sensitivity, approaching 2:1 ($D_T$:$D_P$). This high throttling sensitivity allows for throttling the vent 160b in a manner that is highly sensitive and responsive to differing air bag penetrations. Consequently, this allows the vent tether 112b and guide 123b of the embodiment of FIG. 12 to differentiate and respond to the 50% male and 5% female differently even though the difference in positioning may be slight.

The throttling sensitivity of the vent tether 112b, guide 123b, and vent 160b configuration can be adjusted by changing or adjusting the angle α at which the tether extends from the guide 123ba. In the guide 123b configuration of FIG. 12, the sensitivity is maximized by configuring the tether segments 166 and 168 to extend at large acute angles α from one another, thus producing a throttling sensitivity that approaches 2:1 ($D_T$:$D_P$). To decrease the throttling sensitivity, the vent tether 112b and vent 160b combination are adjusted/configured so that the angle α is decreased, e.g., the segments 166, 168 are moved closer to parallel with one another. As the angle α decreases, the throttling sensitivity decreases, and the degree to which the vent tether 112b throttles the vent 160 for a given occupant penetration decreases.

FIGS. 13A-13C illustrate the apparatus 10b in three conditions. Similar to FIG. 8A, FIG. 13A illustrates the apparatus 10b in a condition prior to the occupant 20b engaging the air bag 14b. In this condition, the vent 160b is fully actuated due to the air bag 14b reaching its fully deployed condition. Also, in this condition, the occupant 20b is spaced from the air bag 14b and must move forward in order to engage and penetrate into the air bag 14b. This distance can be measured in terms of occupant chest to IP distance, which is indicated at $D_1$ in FIG. 13A. The distance that the occupant 20b must travel before this engagement takes place can vary depending on the occupant/seat position prior to air bag deployment.

Similar to FIG. 8B, FIG. 13B illustrates the apparatus 10b in a condition when the occupant 20b initially engages the air bag 14b, having moved forward from the position illustrated in FIG. 13A. The chest to IP distance when this occurs is indicated at $D_2$ in FIG. 13B. At this point, further occupant penetration into the air bag 14b moves the vent tether 112b and guide 123b to throttle the vent 160b toward the non-actuated condition. Occupant penetration into the air bag 14h and rebound out of the air bag produces corresponding throttling of the vent 160b toward the non-actuated and actuated conditions, respectively, of the vent 160b.

Similar to FIG. 8C, FIG. 13C illustrates the apparatus 10b in a condition when the occupant 20b has fully penetrated into the air bag 14b, having moved forward from the position illustrated in FIG. 13B. The chest to IP distance when this occurs is indicated at $D_3$ in FIG. 13C. At this point, the occupant 20b has penetrated the air bag 14b to the point where the vent tether 112b is slackened. In this condition, the vent 160b has been fully throttled by the penetrating occupant 20b, thus placing the vent 160b in the non-actuated condition.

Figure 14A:
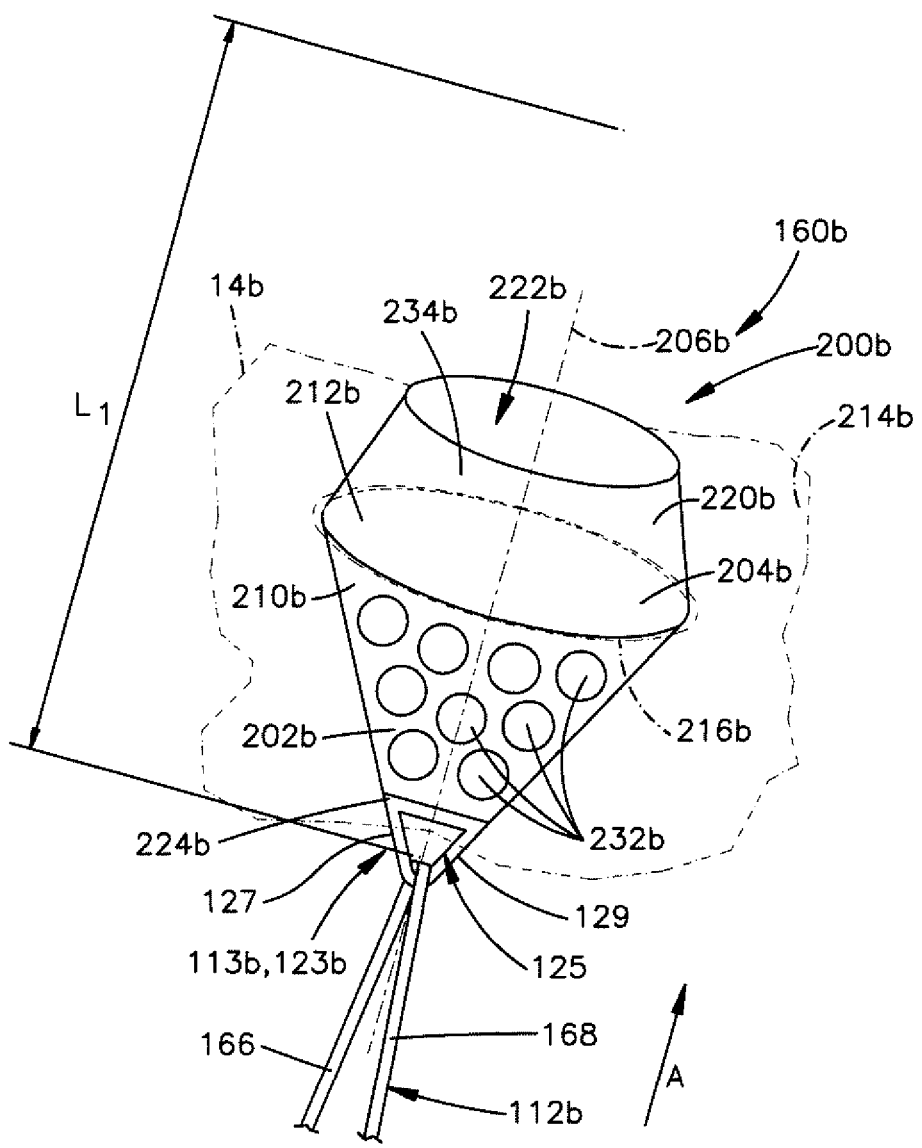

The vent 160b may be an actuated open vent or an actuated closed vent. Examples of actuated open and actuated closed vent types 200b, 260b are shown and described herein with reference to FIGS. 14A-14C and 15A-15C, respectively. Referring to FIGS. 14A-14C, the vent 200b is an actuated open vent that is similar in construction to the vent 200 of FIGS. 10A-10C. In FIGS. 14A-14C, however, the guide tether 113b is formed integrally as part of the vent 200b.

The vent 200b of FIGS. 14A-14C operates similarly to the vent 200 of FIGS. 10A-10C, with the guide 123b applying tension to the inner wall 202b for actuating the vent 200b to release inflation fluid from the air bag 14. In FIGS. 14A-14C, the guide tether 113b has first and second end portions 127, 129 formed integrally with the closed end portion 224b of the vent 200b to form an opening 125 therebetween. The vent tether 112b extends through the opening 125 between the end portions 127, 129 such that the guide 123b and vent tether are slidable relative to one another through the opening. In this embodiment, inflation fluid pressure in the air bag 14 acts to place/maintain the vent 200b in the closed condition at the time of deployment.

The actuated open vent 200b has an actuated open condition illustrated in FIG. 14A, a throttled intermediate condition illustrated in FIG. 14B, and a non-actuated closed condition illustrated in FIG. 14C. The conditions for the vent 200b are identical to the conditions of the vent 200 of FIGS. 10A-10C. Unlike the vent 200, however, the vent tether 112b and guide 123b in FIGS. 14A-14C are tensioned due to the vent 200b moving with the deploying air bag 14b away from the instrument panel 36b (see FIG. 12), i.e., away from the connections 162, 164 of the vent tether 112b to the rear panel 41b. The degree of tension on the vent tether 112b and guide 123b corresponds with the position of the occupant 20b and the degree to which the occupant penetrates the air bag 14b. Accordingly, similar to the vent 200, the vent 200b in FIGS. 14A-14C is throttled by the vent tether 112b and guide 123b moving in the direction B in response to occupant penetration into the air bag 14b.

Figure 15C:
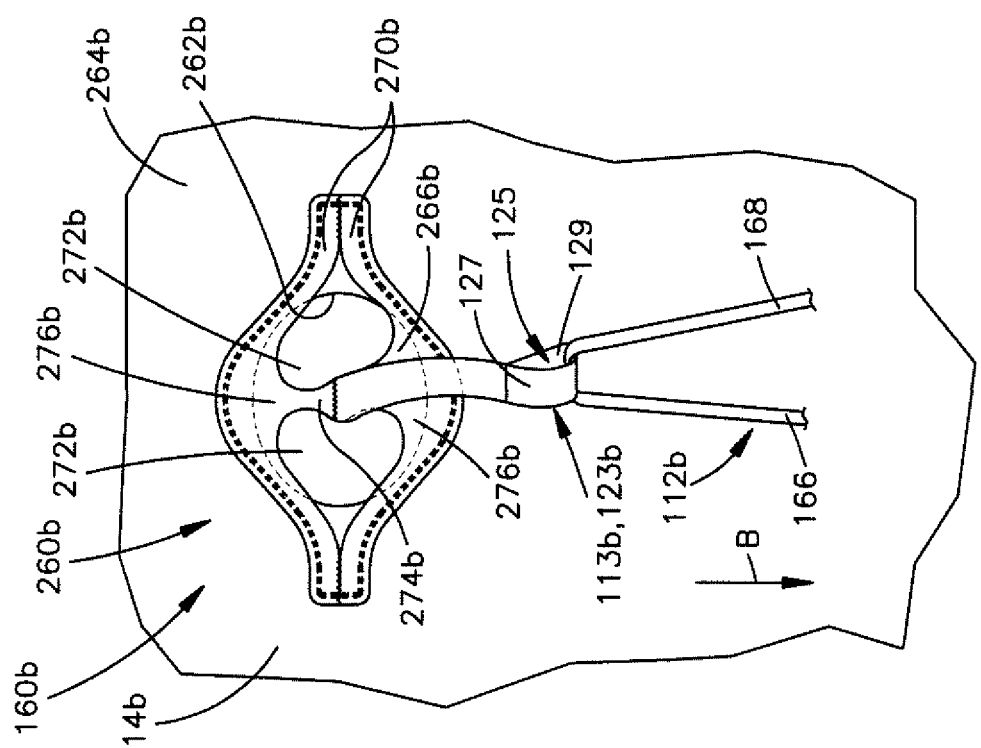

The vent 260b of FIGS. 15A-15C operates similarly to the vent 260 of FIGS. 11A-11C, with the vent tether 112b applying tension to the guide 123b for actuating the vent 260b to prevent the release of inflation fluid from the air bag 14b. In FIGS. 15A-15C, the first and second end portions 127, 129 of the guide 123b are integrally formed with the strip 274b of the vent 160b. The vent tether 112b extends through the opening 125 between the end portions 127, 129 such that the guide 123b and vent tether are slidable relative to one another through the opening. In this embodiment, inflation fluid pressure in the air bag 14 acts to place/maintain the vent 260b in the open condition at the time of deployment.

The actuated closed vent 260b has an actuated closed condition illustrated in FIG. 15A, a throttled intermediate condition illustrated in FIG. 15B, and a non-actuated open condition illustrated in FIG. 15C. The conditions for the vent 160a are identical to the conditions of the vent 260 of FIGS. 11A-11C. Unlike the vent 260, however, the vent tether 112b and guide 123b in FIGS. 15A-15C are tensioned due to the vent 260b moving with the deploying air bag 14b away from the instrument panel 36b (see FIG. 12), i.e., away from the connections 162, 164 of the tether 112b to the rear panel 41b. The degree of tension on the vent tether 112b and guide 123b corresponds with the position of the occupant 20b and the degree to which the occupant penetrates the air bag 14b. Accordingly, similar to the vent 260, the vent 260b in FIGS. 15A-15C is throttled by the vent tether 112b and guide 123b moving in the direction B in response to occupant penetration into the air bag 14b.

The arrangement of the tethers, guide, and vent depicted herein are illustrative of example embodiments. The specific configurations of these embodiments could be changed without departing from the spirit of the present invention. For example, while the tethers, guide, and vent of the present invention are depicted herein implemented in a passenger side frontal air bag, those skilled in the art will appreciate that the tethers, guide, and vent could be applied to other inflatable vehicle occupant protection devices, such as driver side frontal air bags, side impact air bags, side curtain air bags, and inflatable knee bolsters or knee air bags. Similarly, the adaptive tether could be adapted to produce air bag expansion or contraction in virtually any dimension in response to occupant penetration into the air bag.

Additionally, while the vents are illustrated as being positioned at certain locations on side panels of the air bags, the vents could be positioned at alternative locations on the side panels or on other panels of the air bags. Further, although only a single vent is illustrated in the disclosed embodiments, the air bags could include multiple vents.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
   an inflatable vehicle occupant protection device being inflatable between a vehicle surface and the vehicle occupant, the protection device comprising a panel having a portion presented toward the occupant when the protection device is in an inflated condition;
   a vent having at least one opening for releasing inflation fluid from the protection device and having an actuated condition and a non-actuated condition;
   a guide tether connected to the vent; and
   a vent tether connected to the protection device and having a guide connected to the guide tether such that the guide and guide tether are slidable relative to one another, tension on the vent tether applying tension to the guide tether for actuating the vent, wherein the vent is configured to be initially in the non-actuated condition upon initial deployment of the protection device, with further deployment of the protection device to a predetermined degree causing the vent tether to act on the guide tether to place the vent in the actuated condition.

2. The apparatus recited in claim 1, wherein the vent includes a vent door for selectively closing the at least one opening, the guide tether including a first end secured to the vent at a first location and a second end secured to the vent door at a second location spaced from the first location such that the second end moves with the vent door relative to the first end during actuation of the vent.

3. The apparatus recited in claim 1, wherein the vent tether includes a first end connected to the guide tether and a second end secured to the protection device.

4. The apparatus recited in claim 1, wherein the guide in the vent tether includes an opening through which the guide tether extends to slidably connect the vent tether to the guide tether.

5. The apparatus of claim 4, wherein the guide tether is looped through the guide such that displacement of the vent tether by a first amount results in displacement of the guide tether a second amount greater than the first amount.

6. The apparatus of claim 1, wherein the vent tether is slidable along the guide tether during deployment of the protection device prior to the vent tether applying tension to the guide tether.

7. The apparatus recited in claim 1, wherein the actuated condition of the vent is an open condition venting inflation fluid from the protection device and the non-actuated condition of the vent is a closed condition blocking inflation fluid from venting from the protection device.

8. The apparatus recited in claim 7, wherein the vent is configured to be placed in an open condition in response to the protection device reaching a fully deployed condition, the vent tether acting on the guide tether to throttle the vent toward the closed condition in response to an occupant penetration.

9. The apparatus recited in claim 1, wherein the actuated condition of the vent is a closed condition blocking inflation fluid from venting from the protection device and the non-actuated condition of the vent is an open condition venting inflation fluid from the protection device.

10. The apparatus recited in claim 9, wherein the vent is configured to be placed in a closed condition in response to the protection device reaching a fully deployed condition, the vent tether acting on the guide tether to throttle the vent toward the open condition in response to an occupant penetration.

11. The apparatus recited in claim 1, wherein the vent comprises a vent opening with a flow area that can be adjusted to throttle inflation fluid flow through the vent, tension on the vent tether and guide tether throttling the vent.

12. The apparatus recited in claim 11, the vent being connected to the protection device to move with the protection device in response to occupant penetration into the protection device, and wherein this vent movement causes the vent tether to act on the guide tether and thereby throttle the vent.

13. The apparatus recited in claim 11, wherein the proportion of occupant penetration to vent throttling can be adjusted by adjusting at least one of the position of the vent and the position of the connection of the vent tether on the protection device.

14. The apparatus recited in claim 11, wherein the proportion of occupant penetration to vent throttling can be adjusted by adjusting an angle between portions of the guide tether extending through the guide in the vent tether.

15. The apparatus recited in claim 11, wherein the vent is configured such that inflation fluid pressure in the protection device biases the vent toward the non-actuated condition and the vent tether acts on the guide tether to urge the vent toward the actuated condition against the bias of inflation fluid pressure as the protection device inflated and deploys.

16. The apparatus recited in claim 11, wherein the vent tether is configured such that vent tether movement in response to occupant penetration acts on a guide pulley to cause vent throttling by permitting the vent to move under the bias of inflation fluid pressure toward the non-actuated condition.

17. The apparatus recited in claim 11, wherein the throttling of the vent is in proportion to occupant penetration into the protection device.

18. The apparatus recited in claim 1, wherein the vent tether and guide tether are configured to prevent actuation of the vent in response to the protection device being inhibited from deployment.

19. The apparatus of claim 1, wherein the guide tether spaces the vent tether from the vent.

20. An apparatus for helping to protect an occupant of a vehicle, the apparatus comprising:
an inflatable vehicle occupant protection device being inflatable between a vehicle surface and the vehicle occupant, the protection device comprising a panel having a portion presented toward the occupant when the protection device is in an inflated condition;
a vent having at least one opening for releasing inflation fluid from the protection device and having an actuated condition and a non-actuated condition;
a guide provided on the vent; and
a vent tether including a first end portion and a second end portion secured to a rear panel of the protection device opposite the panel, the vent tether being connected to the protection device and extending through the guide such that the vent tether and guide are slidable relative to one another, tension on the vent tether applying tension to the guide for actuating the vent, wherein the vent is configured to be initially in the non-actuated condition upon initial deployment of the protection device, with further deployment of the protection device to a predetermined degree causing the vent tether to act on the guide to place the vent in the actuated condition.

21. The apparatus recited in claim 20, wherein the vent includes a vent door for selectively closing the at least one opening, the first end portion of the tether being secured to a first location on the rear panel of the protection device and the second end portion of the tether being secured to a second location on the rear panel such that the first and second end portions extend at an angle relative to one another, adjustment of the angle between the first and second end portions varying a throttling sensitivity of the vent.

22. The apparatus recited in claim 21, wherein the guide is integrally formed with the vent door.

23. The apparatus recited in claim 20, wherein the guide includes an opening through which the vent tether extends to slidably connect the vent tether to the guide.

24. The apparatus of claim 20, wherein the vent tether is looped through the guide such that displacement of the vent tether by a first amount results in displacement of the guide a second amount less than the first amount.

25. The apparatus of claim 20, wherein the vent tether is slidable along the guide during deployment of the protection device prior to the vent tether applying tension to the tether.

26. The apparatus recited in claim 20, wherein the actuated condition of the vent is an open condition venting inflation fluid from the protection device and the non-actuated condition of the vent is a closed condition blocking inflation fluid from venting from the protection device.

27. The apparatus recited in claim 26, wherein the vent is configured to be placed in an open condition in response to the protection device reaching a fully deployed condition, the vent tether acting on the guide to throttle the vent toward the closed condition in response to an occupant penetration.

28. The apparatus recited in claim 20, wherein the actuated condition of the vent is a closed condition blocking inflation fluid from venting from the protection device and the non-actuated condition of the vent is an open condition venting inflation fluid from the protection device.

29. The apparatus recited in claim 28, wherein the vent is configured to be placed in a closed condition in response to the protection device reaching a fully deployed condition, the vent tether acting on the guide to throttle the vent toward the open condition in response to an occupant penetration.

30. The apparatus recited in claim 20, wherein the vent comprises a vent opening with a flow area that can be adjusted to throttle inflation fluid flow through the vent, tension on the vent tether and guide throttling the vent.

31. The apparatus recited in claim 30, the vent being connected to the protection device to move with the protection device in response to occupant penetration into the protection device, and wherein this vent movement causes the vent tether to act on the guide and thereby throttle the vent.

32. The apparatus recited in claim 30, wherein the proportion of occupant penetration to vent throttling can be adjusted by adjusting at least one of the position of the vent and the position of the connection of the vent tether on the protection device.

33. The apparatus recited in claim 30, wherein the proportion of occupant penetration to vent throttling can be adjusted by adjusting an angle between portions of the vent tether extending through the guide on the vent.

34. The apparatus recited in claim 30, wherein the vent is configured such that inflation fluid pressure in the protection device biases the vent toward the non-actuated condition and the vent tether acts on the guide to urge the vent toward the actuated condition against the bias of inflation fluid pressure as the protection device inflated and deploys.

35. The apparatus recited in claim 30, wherein the vent tether is configured such that vent tether movement in response to occupant penetration acts on the guide to cause vent throttling by permitting the vent to move under the bias of inflation fluid pressure toward the non-actuated condition.

36. The apparatus recited in claim 30, wherein the throttling of the vent is in proportion to occupant penetration into the protection device.

37. The apparatus recited in claim 20, wherein the vent tether and guide are configured to prevent actuation of the vent in response to the protection device being inhibited from deployment.

* * * * *